(12) United States Patent
Ogasawara et al.

(10) Patent No.: US 6,285,359 B1
(45) Date of Patent: Sep. 4, 2001

(54) COORDINATE-POSITION DETECTING DEVICE AND A METHOD FOR DETECTING THE COORDINATE-POSITION

(75) Inventors: Tsutomu Ogasawara; Kenichi Takekawa; Takahiro Ito, all of Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/349,513

(22) Filed: Jul. 9, 1999

(30) Foreign Application Priority Data

Feb. 4, 1999 (JP) .................................................. 11-027775

(51) Int. Cl.$^7$ .............................. G09G 5/00; G01V 9/04; G08C 21/00
(52) U.S. Cl. .................. 345/175; 250/559.29; 178/18.09
(58) Field of Search ..................................... 345/156, 157, 345/173, 175, 179; 250/559.29, 559.38; 178/18.01, 18.09; 341/5, 20, 31

(56) References Cited

U.S. PATENT DOCUMENTS

| | | | |
|---|---|---|---|
| 4,107,522 | * 8/1978 | Walter | 250/221 |
| 4,507,557 | * 3/1985 | Tsikos | 250/341 |
| 4,553,842 | * 11/1985 | Griffin | 356/375 |
| 4,710,760 | * 12/1987 | Kasday | 340/712 |
| 4,811,004 | * 3/1989 | Person et al. | 340/712 |
| 4,936,683 | * 6/1990 | Purcell | 356/152 |
| 5,196,835 | * 3/1993 | Blue et al. | 340/712 |
| 6,100,538 | * 8/2000 | Ogawa | 250/559.29 |

OTHER PUBLICATIONS

U.S. application No. 09/349,461, filed Jul. 09, 1999, pending.
U.S. application No. 09/349,513, filed Jul. 09, 1999, pending.

* cited by examiner

Primary Examiner—Bipin Shalwala
Assistant Examiner—Jeff Piziali
(74) Attorney, Agent, or Firm—Oblon, Spivak, McClelland, Maier & Neustadt, P.C.

(57) ABSTRACT

A coordinate-position detecting device comprising a white board as a coordinate-position entry area, and three reflecting members each for recursively reflecting light from two optical units. The angle between the write-in surface of the white board and the reflecting surface of the reflecting member at the bottom is an obtuse angle. Further, of angles obtained by dividing the above angle by a horizontal surface, the angle between the horizontal surface and the reflecting surface is an acute angle.

40 Claims, 15 Drawing Sheets

COORDINATE-POSITION DETECTING DEVICE AND A METHOD FOR DETECTING THE COORDINATE-POSITION

FIELD OF THE INVENTION

The present invention relates to a method and device for detecting a coordinate position. A touch-panel surface is formed by irradiating a substantially parallel light on the surface of a white board or a display unit and a position on the surface of the white board or the display unit where the light forming the touch-panel surface is blocked is detected. More particularly the invention relates to a method and device for detecting coordinate position in which identification of an incorrect position which occurs due to existence of a foreign substance, dust and dirt or the like on a reflecting member for reflecting a light beam from a light source can be prevented.

BACKGROUND OF THE INVENTION

As a conventional type of coordinate-position detecting device, there is one, for instance, comprising two light sources each for irradiating light in parallel with a display surface of a display unit while rotating. Reflecting sections are provided each for recursively reflecting the light from the light source in its incident direction, and detecting sections are provided at positions where the light sources are provided respectively each for receiving the reflected light from the reflecting section.

The two light sources irradiate, while changing the direction, light to the reflecting sections in parallel with the display surface of the display unit. Each of the reflecting sections recursively reflects the light to the light source. Each of the detecting sections provided at the position of the light source receives the light recursively reflected from the reflecting section. When the light is blocked by a finger or a pen, the detecting section detects the direction of the light source. Coordinates of the position indicated by the finger or the pen can be computed from a distance between the two light sources and the detected directions of the two light sources.

FIG. 16 is a general view of a coordinate-position detecting devices based on the conventional technology. The conventional type of coordinate-position detecting device shown in FIG. 16 comprises a display unit 1601 having a rectangular display surface as a coordinate-position input area. Reflecting members 1602A, 1602B, and 1602C are provided each for recursively reflecting an incident light back to the light source. Light scanners 1603A and 1603B are provided for irradiating a light beam while rotating and receiving the light reflected by any of the reflecting members. A computing section 1604 computes the coordinates indicated by a pen 1607 used for entering a coordinate position, and an interface 1605 outputs the coordinates of the pen 1607 computed by the computing section 1604.

Each of the reflecting members 1602A, 1602B, and 1602C is constructed with a corner cube array where a number of corner cube reflectors are arranged or a recursive reflecting tape, and its reflecting surface is a rectangle. The reflecting members 1602A, 1602B, and 1602C are provided on right, left and lower side of the display unit 1601 so that each of the reflecting surfaces is perpendicular with respect to the display surface of the display unit 1601.

The light scanners 1603A and 1603B are provided above the display unit 1601 at both edges thereof respectively. The light scanners 1603A and 1603B irradiate light to the reflecting members 1602A, 1602B, and 1602C while changing their directions, and receive the reflected light from the reflecting members 1602A, 1602B, and 1602C. When the light is blocked by the pen 1607, the light scanners 1603A and 1603B detect that the light is blocked, and detect the angles θ3 and θ4 corresponding to the directions of the light scanners 1603A and 1603B at that point of time.

The computing section 1604 obtains the angles θ3 and θ4 from the light scanners 1603A and 1603B respectively, computes the coordinates (X2, Y2) indicated by the pen 1607 from the previously measured and inputted distance W2 between the light scanners and the angles θ3 and θ4, and sends the coordinates (X2, Y2) to a personal computer PC or the like through the interface 1605.

In the coordinate-position detecting device having the reflecting member described above, when there is a foreign substance, dust or dirt (which will be collectively called as dirt) on the reflecting surface of a reflecting member, a light beam is blocked by this dirt and does not reach the reflecting surface or can not by reflected thereby. Therefore there occurs a malfunction such that it is determined as if an instruction is given by a pen on a display surface or the like despite there is no instruction given by a pen.

Especially, in the coordinate-position detecting device having light scanners provided above the display unit at both edges thereof and having reflecting members provided on right, left and lower side of the display unit, dirt is easily deposited on the reflecting surface of the reflecting member located in the lower side of the display unit which is facing in an opposite directed with respect to the direction of gravity. Further, when a white board is used in place of the display unit and something is written on it with a marker pen, dirt generated when the writing with the marker pen thereon is erased drops onto the reflecting surface of the reflecting member located in the lower side of the white board and blocks the light, which may again cause malfunction.

When the user notices the malfunction or notices that dirt is deposited on the reflecting surface of a reflecting member, he or she removes the dirt by cleaning such as wiping with a cloth in order to avoid the malfunction and then restarts using the board.

In the conventional technology, cleaning is carried out as necessary when dirt is deposited on the reflecting surface of a reflecting member. However, the deposited dirt may be a cause of malfunction because it is easy for the dirt to get deposited on the reflecting surface of a reflecting member located in the lower side of the white board or the display unit, and the work has to be interrupted frequently in order to clean the reflecting surface to accurately detect a coordinate position Thus, in the conventional technology a load of cleaning the reflecting surface onto the user has been quite heavy.

Since the reflecting surface of a reflecting member is fixed to the white board, it is quite difficult to clean the surface, and especially the corners of the reflecting members on the two sides tend to accumulate the dirt therein and it is difficult to clean the dirt in these corners.

Further, the corners formed by the reflecting members on two sides have the smallest incident angle of a light beam from a light source, so that reflectivity of the light from the light source is reduced at these corners. When there are variations in joints each of two reflecting members at the corners, the reflectivity is further reduced.

SUMMARY OF THE INVENTION

It is an object of the present invention to reduce, for the purpose of solving the problems described above, frequency of occurrence of malfunction, interruption of works, and the load of cleaning onto a user by making it difficult for the dirt to get deposited on the reflecting surface of a reflecting member.

It is another object of the present invention to easily clean the reflecting surface of a reflecting member.

It is another object of the present invention to enhance reflectivity of a light at the corner formed by the reflecting members on two sides.

In the present invention, angle of the reflecting surface of a recursively reflecting unit is adjusted by an angle adjusting unit. Thus, the angle between the surface of a white board or the display unit and the reflecting surface of the recursively reflecting unit can be adjusted to such an angle that the dirt does not get deposited on the reflecting surface or the surface can easily be cleaned.

In the present invention, angle between the reflecting surface of a reflecting member provided in the bottom side forming a rectangle and the surface of the white board or the display unit is an obtuse angle. Further, of angles obtained by dividing the angle which the reflecting surface of the bottom-side reflecting member forms with the surface of the white board or the display unit by a horizontal surface, the angle which the reflecting surface forms with the horizontal surface is an acute angle. Therefore, when the dirt drops on the reflecting surface of the bottom-side reflecting member it slips down along the reflecting surface thereof.

In the present invention, the angle between the reflecting surface of a reflecting member provided in the bottom side forming a rectangle and the surface of the white board or the display unit is an acute angle. Further, a space is provided between the reflecting surface of the bottom-side reflecting member and the surface of the white board or the display unit. Therefore, when the dirt drops on the reflecting surface of the bottom-side reflecting member it slips down along the reflecting surface thereof into the space.

In the present invention, angle between the surface of the white board or the display unit and the reflecting surface of the reflecting member is adjusted by an angle adjusting unit. Thus, angle between the surface of the white board or the display unit and the reflecting surface of the recursively reflecting unit can be adjusted to such an angle at which the dirt can not get deposited on the reflecting surface or the surface can easily be cleaned.

In the present invention, a reflecting member is detachably provided. Thus, the reflecting member can be detached from the coordinate-position detecting device to be cleaned and attached thereto again after cleaning.

In the present invention, spaces are provided at the corners where cleaning is difficult and dirt is easily accumulated. Therefore, dirt does not get accumulated at the corners and cleaning thereof can easily be carried out.

In the present invention, at the corners where an incident angle of a light beam from a light source is the smallest and reflectivity is the lowest, light is reflected by the reflecting surface of a reflecting member having a larger incident angle of the light. In other words, the light falling on a section having the lowest reflectivity is reflected by a reflecting member having higher reflectivity.

In the present invention, a cylindrical reflecting member rotates around the center of the circle as a central axis. Dirt deposited on the reflecting surface facing in the direction which is reverse to the direction of gravity, in other words facing upward, drops when the reflecting surface is rotated so as to point towards the direction of gravity, in other words downward.

In the present invention, the reflecting member is formed in an endless belt and is rotated by a rotating roller. Thus, dirt deposited on the reflecting surface facing the direction reverse to the direction of gravity, in other words facing upward, drops when the reflecting surface is rotated so as to point towards the direction of gravity, in other words downward.

In the present invention, a cleaning unit cleans the surface of a reflecting member when the reflecting member is rotated.

In the present invention, a plate shaped reflecting member is turned upside down. Thus, dirt deposited on the reflecting surface facing the direction reverse to the direction of gravity, in other words facing upward, drops when the reflecting surface is rotated so as to face towards the direction of gravity, in other words downward.

In the present invention, a polygonal reflecting member rotates with respect to its central axis. Thus, dirt deposited on the reflecting surface facing the direction reverse to the direction of gravity, in other words facing upward, drops when the reflecting surface is rotated so as to face towards the direction of gravity, in other words downward.

In the present invention, a cleaning unit moves along the reflecting surface of a reflecting member in the side where the light irradiated from a light source does not reach and cleans the reflecting surface.

In the present invention, transparent hard coating provided on the surface of a reflecting member protects the reflecting surface.

Other objects and features of this invention will become understood from the following description with reference to the accompanying drawings.

DESCRIPTION OF THE PREFERRED EMBODIMENTS

Detailed description is made hereinafter for preferred embodiments of the coordinate-position detecting device and the coordinate-position detecting method according to the present invention in the order from Embodiment 1 to Embodiment 9 with reference to the attached drawings.

A coordinate-position detecting device according to Embodiment 1 has a reflecting member for reflecting (recursively reflecting) an incident light to an opposite direction with respect to its incident direction provided therein so that a reflecting surface of the reflecting member has an obtuse angle with respect to a writing surface of a white board for entering a coordinate position and that, of angles obtained by dividing the angle between the reflecting surface and the writing surface by a horizontal surface, the angle between the reflecting surface and the horizontal surface is an acute angle.

Although a method of irradiating a fan-shaped light from a light source will be taken up as an example in Embodiment 1, the method of scanning a light beam having been described as an example of conventional technology may be employed. Also a display unit may be used in place of a white board.

Figure 1:
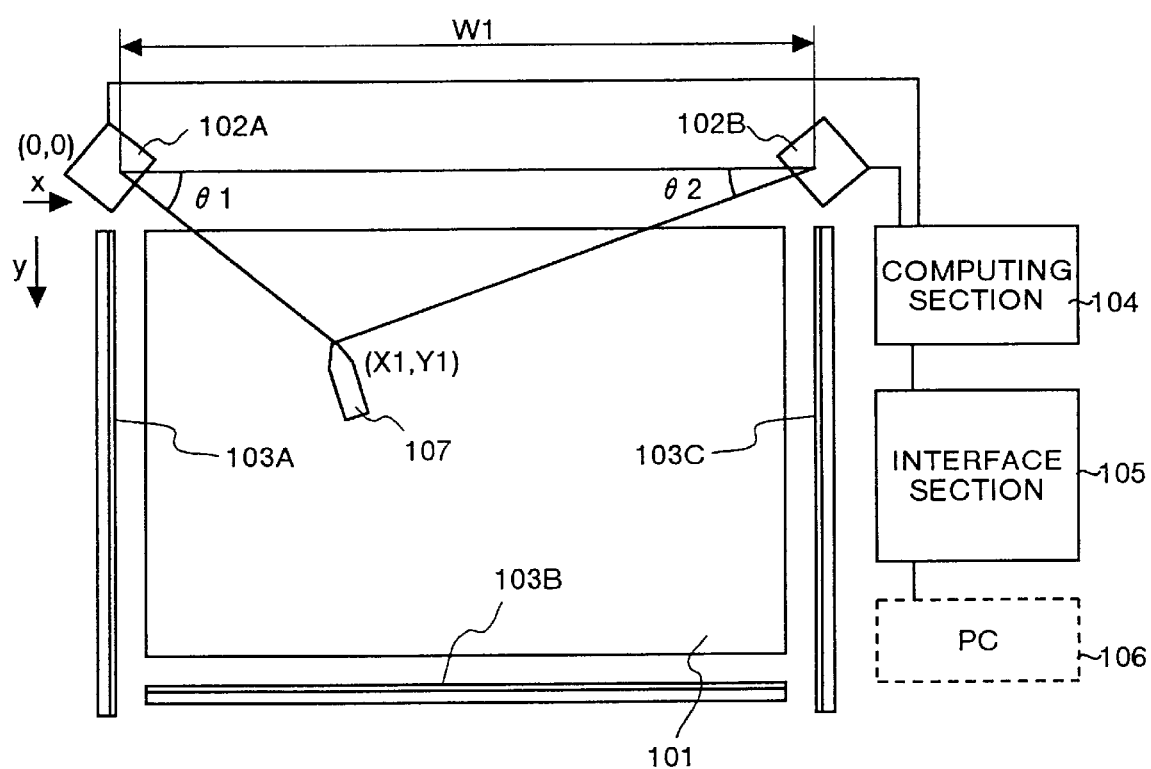
FIG. 1 shows the configuration of a coordinate-position detecting device according to Embodiment 1 of the present invention.

FIG. 1 is a general view of a coordinate-position detecting device according to Embodiment 1 of the present invention. The coordinate-position detecting device in Embodiment 1 comprises a white board 101 as a coordinate-position entry area. Optical units 102A and 102B are provided above the white board 101 at both edges thereof each for irradiating fan-shaped light in parallel with the writing surface of the white board 101 to form a touch-panel surface. Reflecting members 103A, 103B, and 103C are provided on left, right and lower side of the white board 101 for recursively reflecting the light from the optical units 102A and 102B. A computing section 104 computes the coordinates (X1, Y1) of a marker pen 107 or the like. An interface section 105 outputs the coordinates (X1, Y1) computed by the computing section 104 to an external personal computer PC 106 or the like.

The optical units 102A and 102B irradiate fan-shaped light beams to the reflecting members 103A, 103B, and 103C. The irradiated light is recursively reflected by the reflecting members 103A, 103B, and 103C, and received by the optical units 102A and 102B. When something is written with the marker pen 107, in other words, when the light from the optical units 102A and 102B is blocked by the marker pen 107, light in that blocked portion does not reach the reflecting members 103A to 103C, consequently, recursive reflection of the light does not also occur, so that the light does not reach the optical units 102A and 102B and hence is not received thereby.

The optical units 102A and 102B detect the angles θ1 and θ2 each of which a line linking positions corresponding to the light sources forms with each direction to which the light is not received on the coordinate plane overlapping with the touch-panel surface, and output the information indicating the angles θ1 and θ2 to the computing section 104.

On the coordinate plane, assuming that a distance between the positions corresponding to the light sources of the optical units 102A and 102B is W1, the position corresponding to the light source of the optical unit 102A is the origin, and that X axis is taken in a direction from the optical unit 102A to the optical unit 102B while Y axis is taken in a direction along the side of the white board 101, coordinates (X1, Y1) of the marker pen 107 can be derived from the following equations.

$X1 = W1 \cdot \tan \theta2 / (\tan \theta1 + \tan \theta2)$ $Y1 = W1 \cdot \tan \theta1 \cdot \tan \theta2 / (\tan \theta1 + \tan \theta2)$ The computing section 104 obtains the angles θ1 and θ2 from the optical units 102A and 102B and computes the coordinates (X1, Y1) of the marker pen 107 from the previously measured and entered distance W1 and the angles θ1 and θ2 by using the equations described above. The computing section 104 outputs the coordinates (X1, Y1) to the PC 106 through the interface 105. For example, when a line is drawn with a marker pen 107 on the white board 101, a lapse of time and each position as a function of time are detected. By processing this information by the PC 106, the drawn image can be fetched.

Figure 2B:
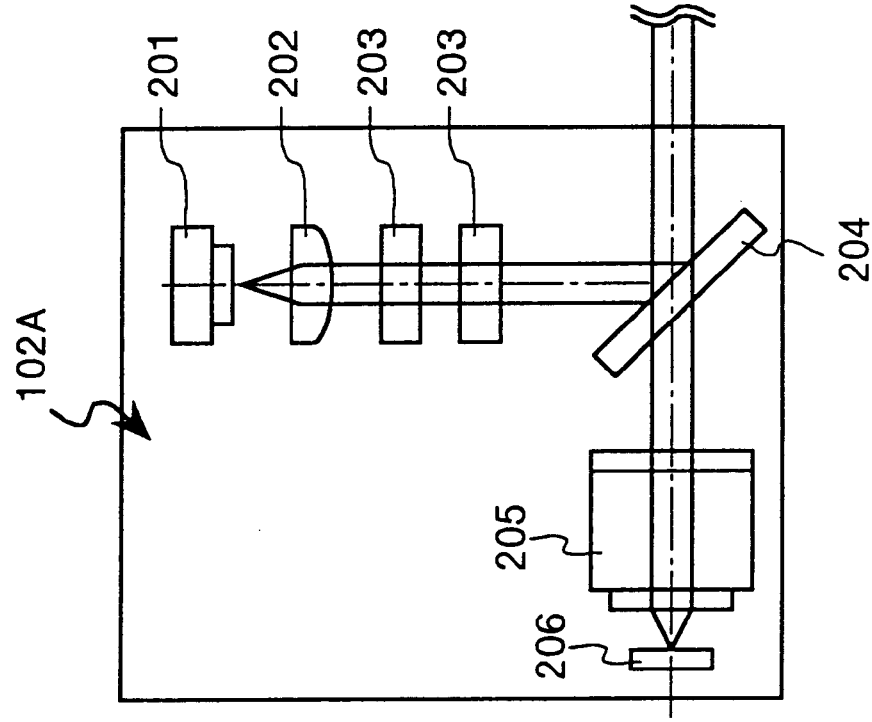
FIG. 2A and FIG. 2B shows the configuration of an optical unit according to Embodiment 1.
Figure 2A:
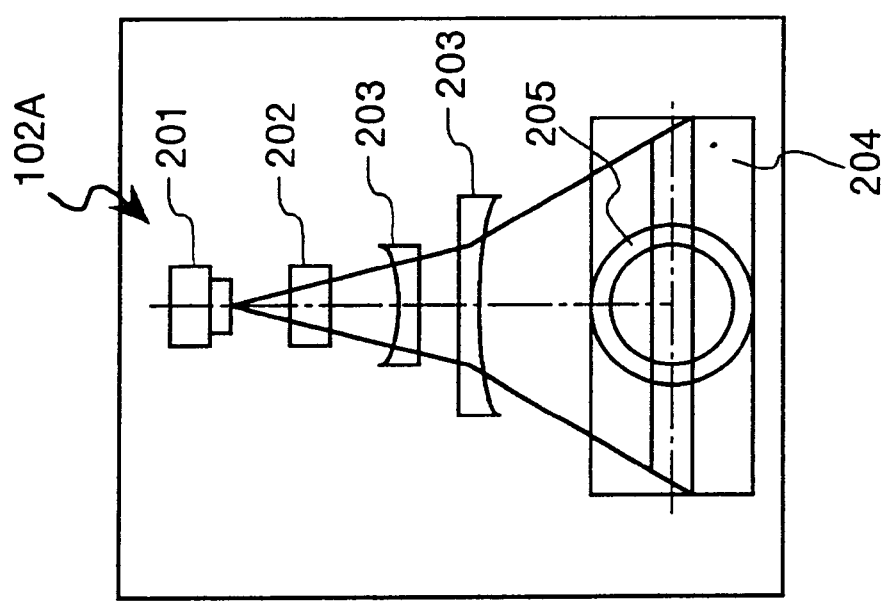

FIG. 2 shows the optical unit 102A according to Embodiment 1. FIG. 2A is a front view thereof, and FIG. 2B is a side view thereof. The optical unit 102A comprises a laser diode 201 as a light source, an optical lens 202 which may be a cylindrical lens that changes a magnification only in one direction of an image or it may be a toroidal lens that changes a magnification only in one direction of an image without change in the magnification due to any incident angle. Diffusing lenses 203 are provided for diffusing light irradiated from the laser diode 201 in a fan shape. A half mirror 204 irradiates the light from the diffusing lens 203 toward the reflecting members 103B and 103C and also pass therethrough the light recursively reflected by the reflecting members 103B and 103C. Converging lens 205 converges the light passing through the half mirror 204, and a light receiving section 206 detects a direction from which the reflected light does not come back.

Herein, it is assumed that any laser diode that emits infrared light is used as the laser diode 201 although one emitting visible light may be used. It should be noted that also the optical unit 102B has the same configuration as described above.

The light irradiated from the laser diode 201 passes through the optical lens 202 and diffusing lens 203, and is reflected by the half mirror 204. The reflected light goes out the optical unit 102A and goes along the plane in parallel with the surface of the white board 101 while spreading in a fan shape. When there is nothing to block the light on the touch-panel surface, light is recursively reflected by the reflecting members 103B and 103C, and the reflected light returns to the optical unit 102A and passes through the half mirror 204 and converging lens 205 to be received by the light receiving section 206. On the other hand, when there is something to block the light on the touch-panel surface, light from the optical unit 102A is blocked, and so a portion of the light does not reach the reflecting members 103B and 103C, consequently the light receiving section 206 does not receive the reflected light of the portion of the light.

Figure 3:
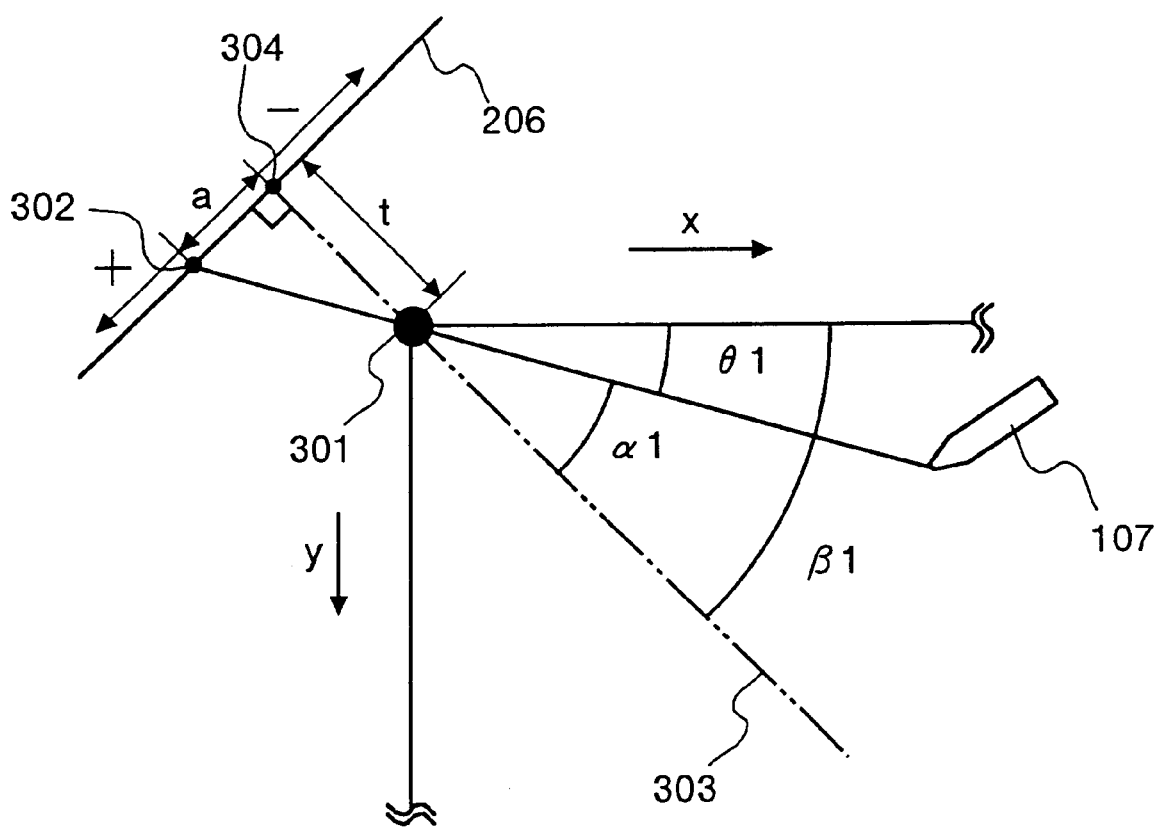
FIG. 3 explains a method for detecting the angle according to Embodiment 1.

A method of obtaining θ1 as a direction in which the panel is touched with the marker pen 107, in other words as a direction in which the light is blocked by the marker pen 107 will be explained in the following. FIG. 3 explains the method for detecting the angle according to Embodiment 1.

On the coordinate plane, it is assumed that a point corresponding to a central of the light source is a light source point 301, a point of intersection of a straight line linking a position of the marker pen 107 with the light source point 301 and the light receiving section 206, in other words, a central point of shadow generated by the marker pen 107 is a shadow central point 302, a perpendicular from the light source point 301 to the light receiving section 206 is a perpendicular 303, and a point of intersection of the perpendicular 303 and the light receiving section 206 is light-receiving central point 304.

Also, it is assumed that a position of the shadow central point 302 with respect to the light-receptive central point 304 with a right direction therefrom being minus and a left direction therefrom being plus on the light receiving section 206 is a. An angle which a straight line linking the position indicated by the marker pen 107 with the light source point 301 forms with the perpendicular 303 is α1, an angle which the perpendicular 303 forms with the X axis is β1, and a distance between the light source point 301 and the light receiving section 206 is t. The angle θ1 can be derived with the following equation by obtaining the position a through detection of the shadow on the light receiving section 206 by previously measuring the distance t and the angle β1. It should be noted that the angle θ2 can also be derived in the same manner as described above.

$$\tan \alpha1 = a/t$$

$$\theta1 = \beta1 - \alpha1$$

Figure 4:
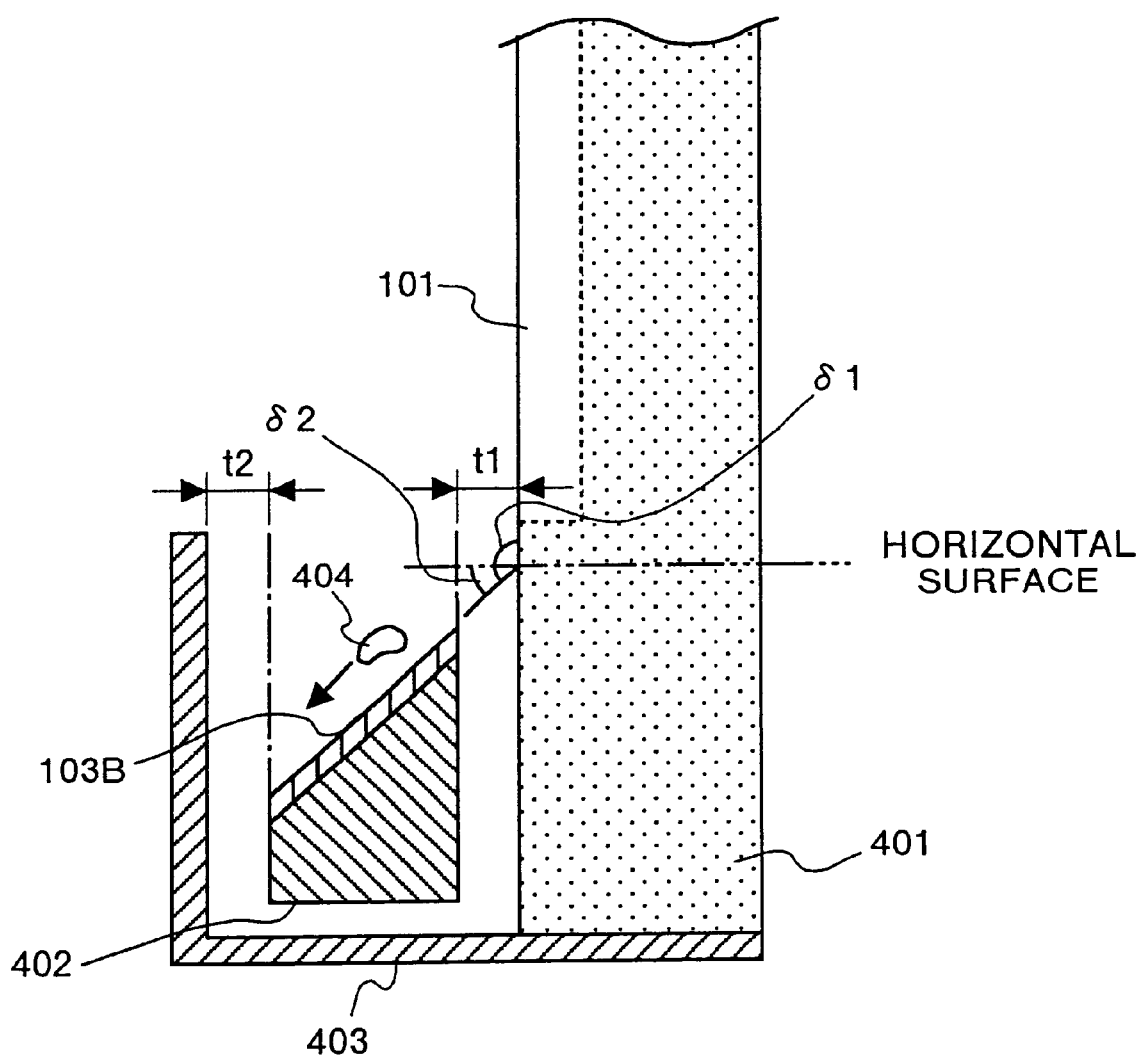
FIG. 4 is a cross-section explaining the configuration of a reflecting member according to Embodiment 1.

The reflecting member 103B which is a principle component of the present invention will be described with reference to FIG. 4, FIG. 5A and FIG. 5B. FIG. 4 is a cross-section explaining the configuration of the reflecting member 103B according to Embodiment 1. The white board 101 is mounted on a base 401 as a foundation of the coordinate-position detecting device by a fastener section not shown herein. The reflecting member 103B is mounted on a supporting member 403 that supports reflecting member. A cover 403 which prevents unnecessary extraneous light and also acts as a dirt accumulator is provided around the reflecting member 103B.

The supporting member 402 is so provided that the reflecting surface of the reflecting member 103B has a cross-sectional profile in a trapezoidal form so as to make an angle δ1 as an obtuse angle with respect to the surface of the white board 101. Further, of angles obtained by dividing the angle which the reflecting surface of the reflecting member 103B makes with the surface of the white board 101 by a horizontal surface, i.e. the angle δ2 between the horizontal surface and the reflecting surface, is an acute angle.

Spaces t1 and t2 are provided between the white board 101 and the reflecting member 103B and between a portion of the cover 403 to prevent extraneous light and the reflecting member 103B respectively. It should be noted that only the space t2 may be provided.

Figure 5A:
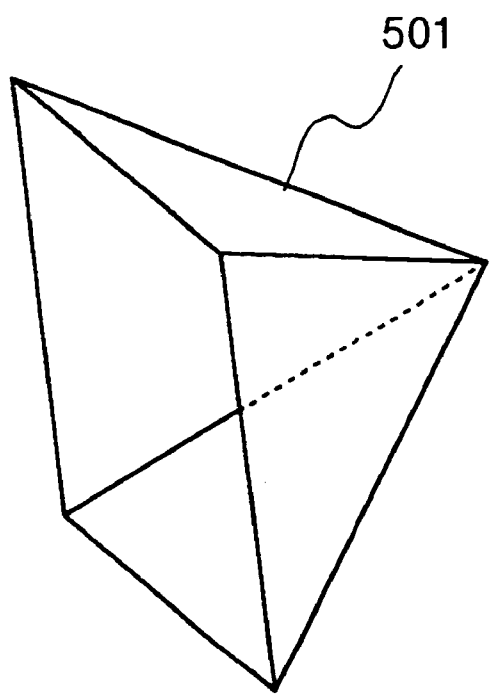
FIG. 5A and FIG. 5B show corner cube reflectors used as the reflecting member according to Embodiment 1.
Figure 5B:
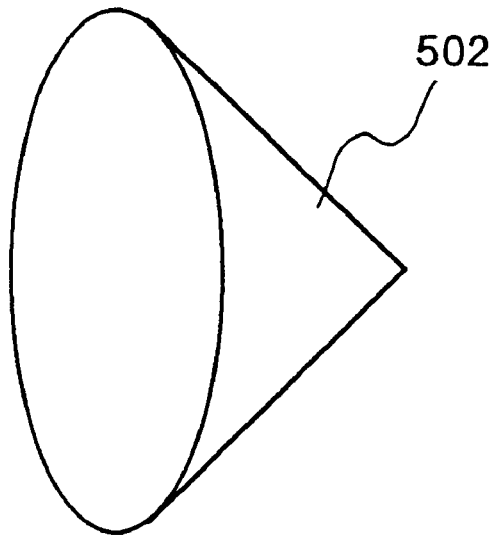

FIG. 5A and FIG. 5B show corner cube reflectors used as the reflecting members 103A, 103B, and 103C according to Embodiment 1. Each of the reflecting members 103A, 103B, and 103C is constructed with, for instance, a corner cube array where a number of reflectors 501 or 502 are arranged or may be constructed with a low-cost recursive reflecting tape. Each reflecting surface of the reflecting members 103A, 103B, and 103C is a rectangle. It should be noted that the optical units 102A and 102B correspond to the light source and the light receiver according to the present invention.

In the configuration described above, for instance, when a foreign substance, dust, or dirt 404 drops on the reflecting member 103B, the dirt 404 moves along the slope of the reflecting member 103B, and drops from the space t2 to be collected in the cover 403. Dirt generated when writing with a marker pen on the white board 101 is erased drops through the space t1 to be collected in the cover 403. The cover 403 is detachable, so that the accumulated dirt 404 can be cleared.

With Embodiment 1 as described above, the reflecting surface of the reflecting member 103B makes an obtuse angle δ1 with the surface of the white board 101, and when this angle is divided with a horizontal surface, an angle which the reflecting surface makes with the horizontal surface is an acute angle. Therefore, any dirt that may block the light falling on the reflecting member 103B slips down along the slope of the reflecting surface. Hence, it is difficult for the dirt to get deposited on the reflecting surface of the reflecting member 103B, which allows frequency of malfunction, interruption of works, and the load of cleaning onto a user to be reduced.

Since the spaces t1 and t2 are provided between the reflecting member 103B and the white board 101 and between the reflecting member 103B and the cover 403 from where dirt 404 can drop in the cover 403, the amount of dirt 404 that drops on the reflecting member 103B can considerably be reduced.

Figure 6:
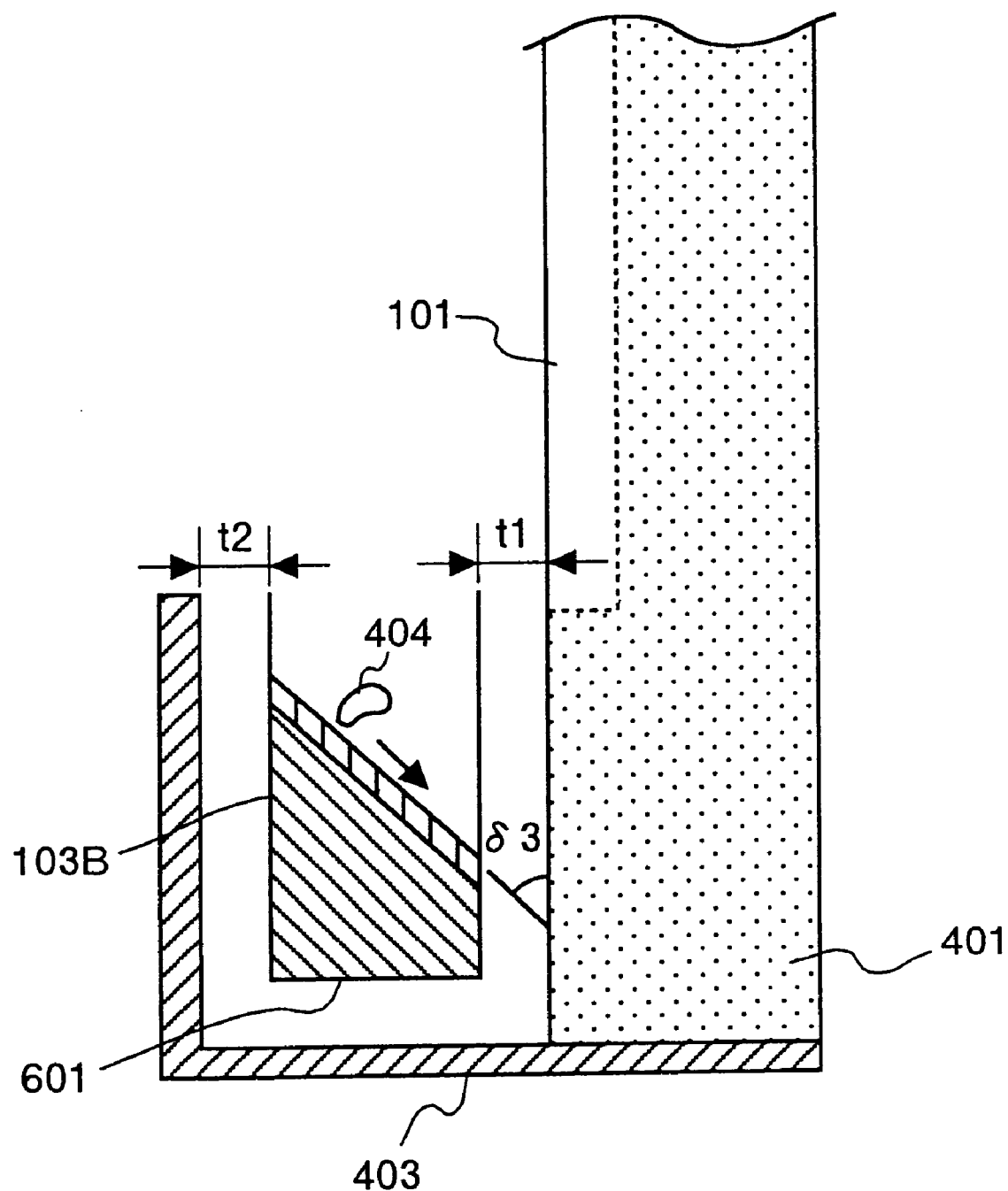
FIG. 6 is a cross-section explaining the configuration of a reflecting member according to Embodiment 2 of the present invention.

A coordinate-position detecting device according to Embodiment 2 has basically the same configuration as that in Embodiment 1. Only the angle which the reflecting surface of the supporting member makes with the reflecting member 103B is different. Therefore, same reference numerals are assigned to the sections corresponding to those in Embodiment 1 and description thereof is omitted herein, and only the different sections will be explained. FIG. 6 is a cross-section explaining the configuration of a reflecting member 103B according to Embodiment 2 of the present invention. A supporting member 601 in Embodiment 2 supports the reflecting member 103B so that the reflecting surface of the reflecting member 103B has an acute angle δ3 with respect to the surface of the white board 101.

Operation of Embodiment 2 having the configuration as described above will be explained below. Dirt 404 dropped on the reflecting member 103B moves along the reflecting surface of the reflecting member 103B drops further from the space t1 in the cover 403. Dirt 404 directly dropped in the spaces t1 and t2 is directly accumulated in the cover 403.

With Embodiment 2 as described above, the reflecting member 103B makes an acute angle δ3 with the surface of the white board 101, and any dirt which may block the a light falling on the reflecting member 103B slips down along the slope of the reflecting surface. Thus, it is difficult for the dirt to get deposited on the reflecting surface of the reflecting member 103B, which allows frequency of malfunction, interruption of works, and the load of cleaning onto a user to be reduced.

Since the spaces t1 and t2 are provided between the reflecting member 103B and the white board 101 and between the reflecting member 103B and the cover 403 from where dirt 404 can drop in the cover 403, the amount of dirt 404 that drops on the reflecting member 103B can considerably be reduced.

Figure 7A:
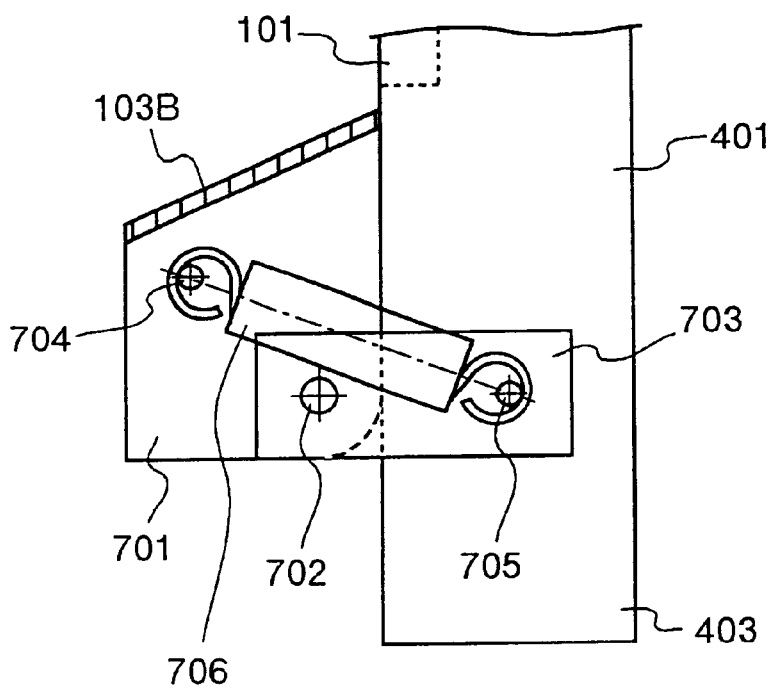
FIG. 7A and FIG. 7B are cross-sections explaining the configuration of a reflecting member according to Embodiment 3 of the present invention.
Figure 7B:
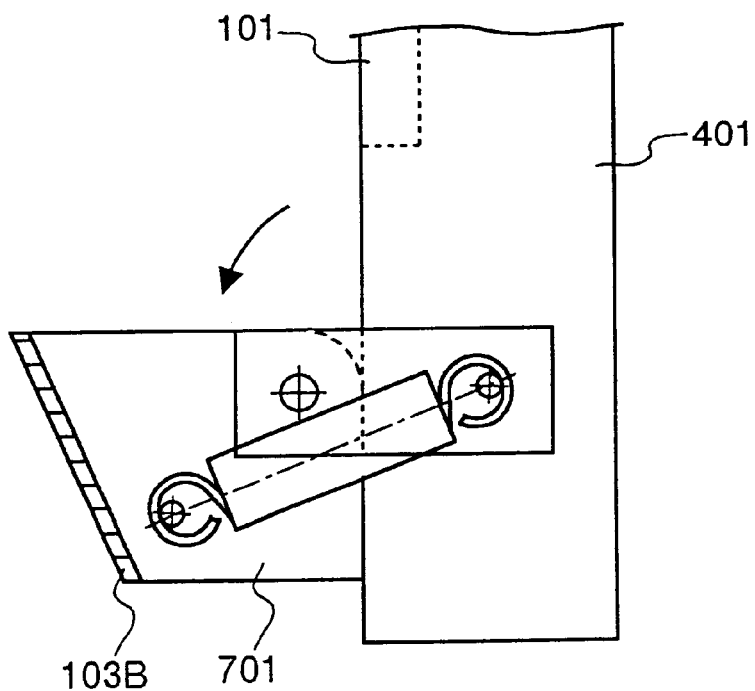

A coordinate-position detecting device according to Embodiment 3 has basically the same configuration as that in Embodiment 1 and, in addition, has an angle adjusting function for clearing. As for the same sections as those in the coordinate-position detecting device in Embodiment 1, description thereof is omitted herein, and only the different sections will be explained. FIG. 7A and FIG. 7B are cross-sections explaining the configuration of a reflecting member 103B according to Embodiment 3 of the present invention.

In Embodiment 3, a rotatable pin 702 is fixed on the lower side of the side of base 401 at both edges of a supporting member 701 by a press-fitting method or the like. The pin 702 is rotatably supported by side plates 703 fixed to the base 401. A pin 704 is fixed on both edges of the supporting member 701 or in the upper side thereof opposite to one side of the base by a press-fitting method or the like. Another pin 705 is fixed to the side plate 703. A spring 706 is provided between the pin 704 and pin 705 to pull and pressure the supporting member 701 toward the side of the base 401 to hold in its position. It should be noted that the pins 702, 704, and 705, spring 706, and the side plate 703 correspond to the angle adjusting unit according to the present invention.

In the configuration described above, when dirt 404 drops from the surface of white board 101 onto the reflecting surface of the reflecting member 103B, it slips down along the reflecting surface of the reflecting member 103B. Even when the dirt 404 is left on the reflecting surface, if the user pulls the upper section of the supporting member 701 to the lower side in opposite side to the base 401, the supporting member 701 makes a ¼ rotation about the pin 702, and so the dirt is shaken off. Further, as the reflecting member 103B is pressured and held in a state in which the member is directed toward the user, so that the member can easily be cleaned.

With Embodiment 3 as described above, as the dirt 404 is shaken off when the reflecting member 103B makes a ¼ rotation, the dirt on the reflecting surface of the reflecting member 103B can be reduced. Also, as the reflecting member 103B can be directed to the side of the user, the reflecting surface of the reflecting member 103B can easily be cleaned. A contact section, between the reflecting surface of the reflecting member 103B and the surface of the white board, which is hard to be cleaned especially when the section therebetween is fixed can easily be cleaned.

Although it is described that the reflecting surface of the reflecting member has an obtuse angle with respect to the surface of the white board in Embodiment 3, like in Embodiment 2, the reflecting surface of the reflecting member may have an acute angle with respect to the write-in surface of the white board and have a space between the reflecting surface thereof and the white board. Further, the reflecting surface of the reflecting member may have an angle of 90 degrees with respect to the write-in surface of the white board. Also, the angle of not only the reflecting member provided in a bottom position of the white board but also the reflecting members in both sides may be adjusted.

Figure 8A:
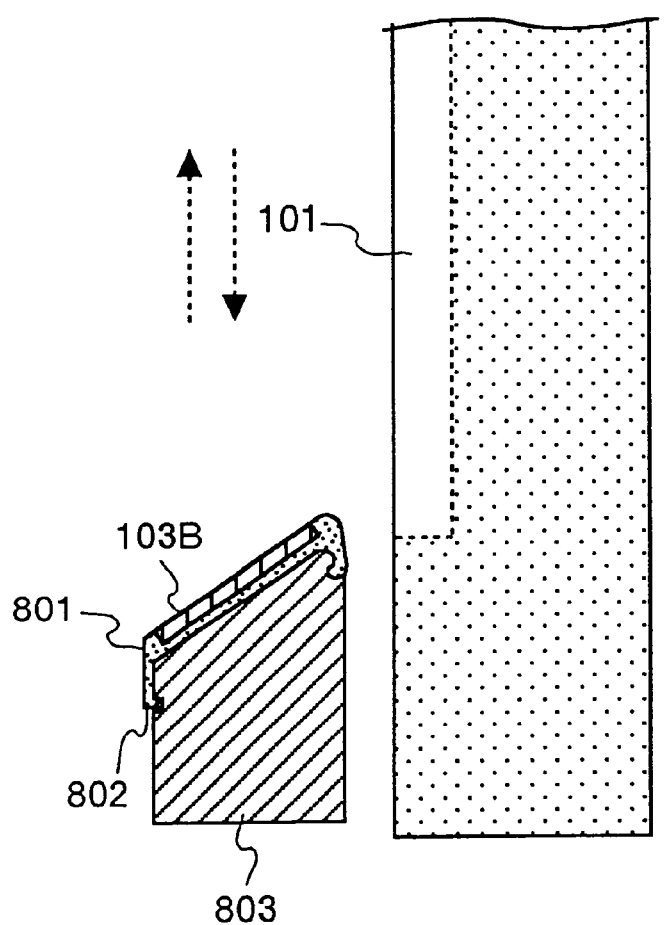
FIG. 8A and FIG. 8B are cross-section explaining the configuration of a reflecting member according to Embodiment 4 of the present invention.
Figure 8B:
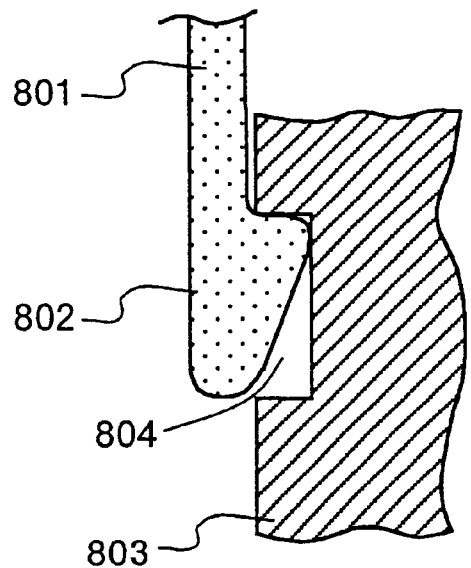

A coordinate-position detecting device according to Embodiment 4 has basically the same configuration as that in Embodiment 1, in addition, has a reflecting member 103B detachably provided therein. As for the same sections as those in the coordinate-position detecting device in Embodiment 1, description thereof is omitted herein, and only the different sections will be explained. FIG. 8A and FIG. 8B are general cross-sections explaining the configuration of a reflecting member 103B according to Embodiment 4 of the present invention.

The reflecting member 103B in Embodiment 4 is adhered and fixed to a guide plate 801 having a claw 802, so that the reflecting member is integrally constructed with the guide plate 801. A grove 804 is provided in the supporting member 803, and the guide plate 801 is fixed to the supporting member 803 by engaging the claw 802 with the grove 804. Namely, the guide plate 801 is snapped into the supporting member 803.

In the configuration described above, for example, when the user pulls upward the guide plate 801 integrally formed with the reflecting member 103B, the claw 802 is disengaged from the grove 804, and the reflecting member 103B as well as the guide plate 801 is separated from the supporting member 803. In other words, the reflecting member 103B is detached from the coordinate-position detecting device. By detaching the reflecting member 103B therefrom, the reflecting member 103B can easily be cleaned.

Figure 9A:
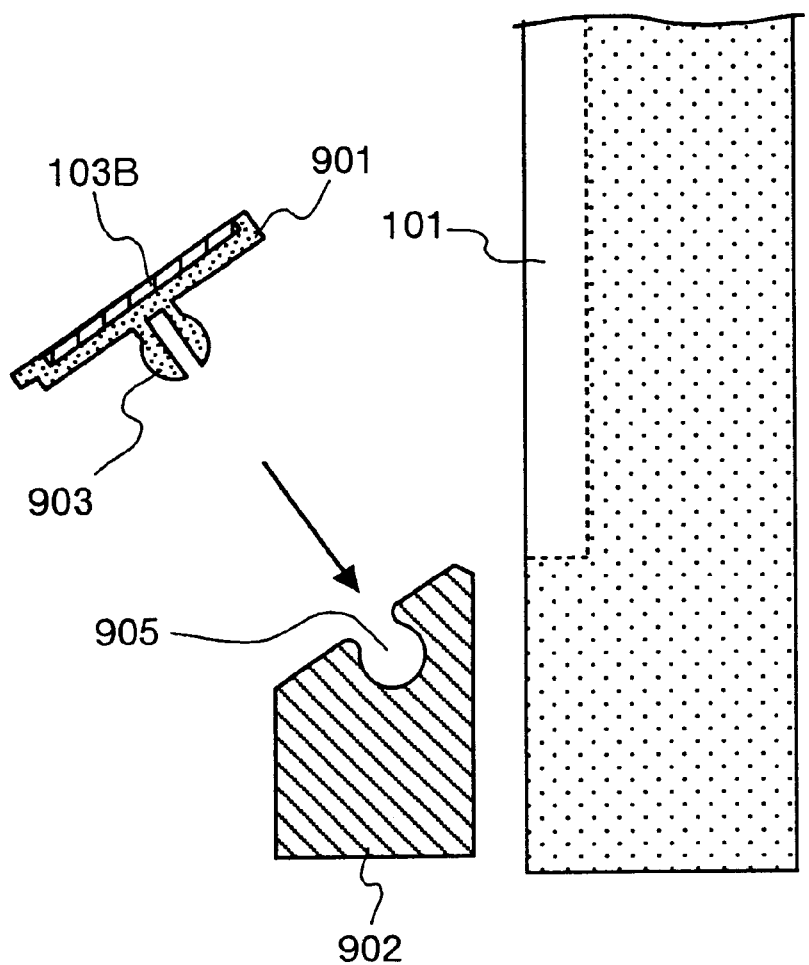
FIG. 9A and FIG. 9B are cross-section explaining the configuration of another reflecting member according to Embodiment 4.
Figure 9B:
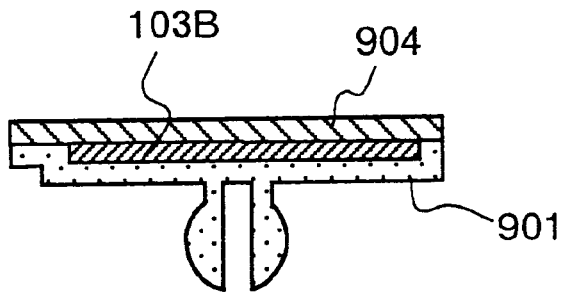

It should be noted that any method of detachably fixing the reflecting member 103B to the coordinate-position detecting device may be employed, and there may be a method of, for instance, using a guide plate 901 having a claw 903 at the center thereof and a supporting member 902 having a grove 905 at the center thereof as shown in FIG. 9A. Also, as shown in FIG. 9B, a hard coating 904 for protecting the reflecting surface of the reflecting member 103B from any flaws may be provided on the surface of the reflecting member 103B.

With Embodiment 4 as described above, as the guide plate 801 can be detached by pulling it upward, so that the reflecting surface of the reflecting member 103B ca n easily be cleaned by placing it on a stable position or in some other way. In addition, when a hard coating 904 is provided on the surface of the reflecting member 103B, the reflecting surface thereof can be protected, so that particular care need not be taken while cleaning, which allows the reflecting member 103B to be cleaned easily.

Figure 10:
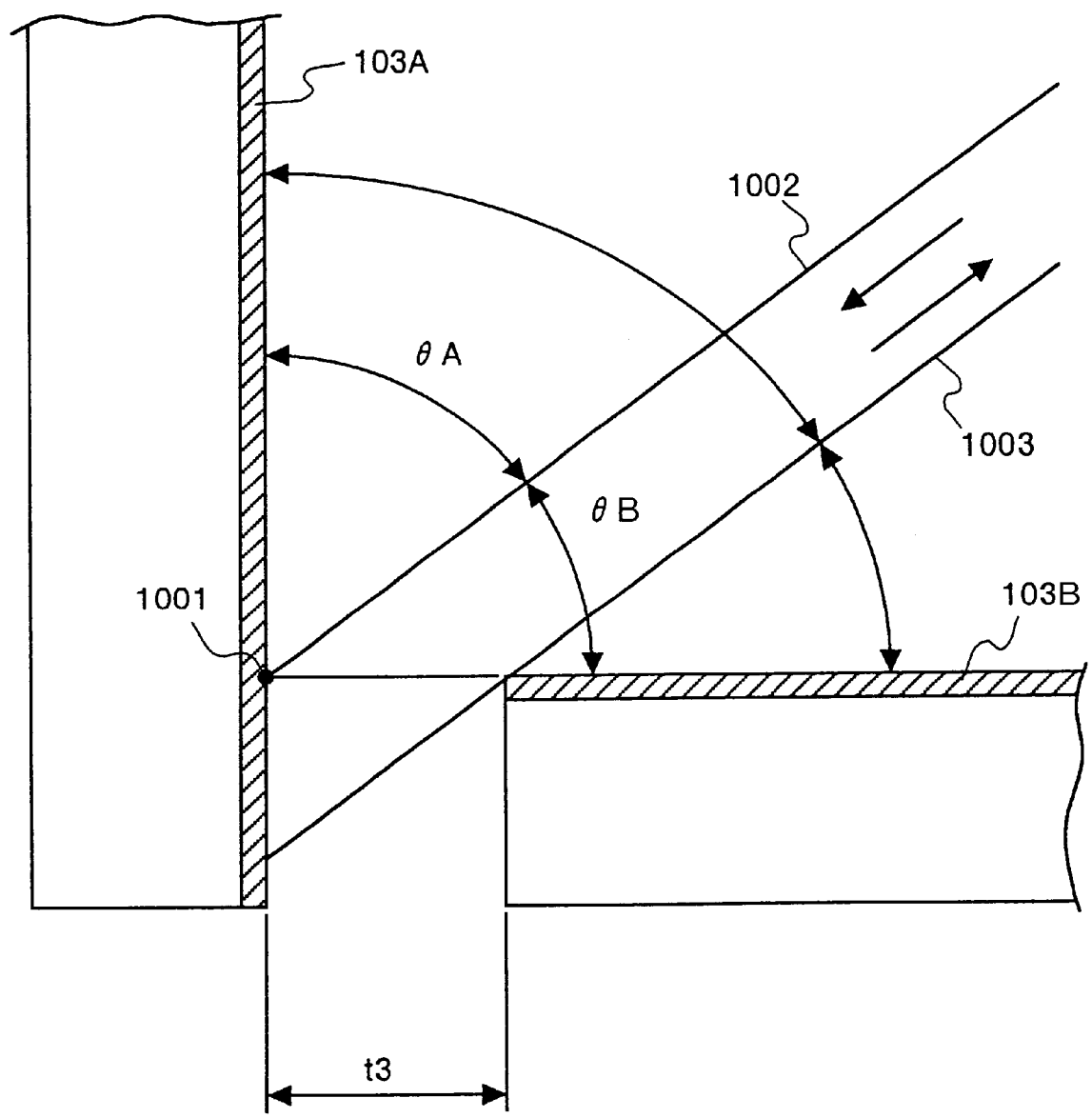
FIG. 10 explains the reflection at an edge section of a reflecting member according to Embodiment 5 of the present invention.

A coordinate-position detecting device according to Embodiment 5 has basically the same configuration as that in Embodiment 1 and is different only in the periphery of an edge of a reflecting member 103B, so that description of the sections the same as those described above is omitted herein, and only the different sections will be explained. FIG. 10 explain the reflection near the edge section of the reflecting member 103B according to Embodiment 5 of the present invention.

On the coordinate plane, it is assumed that an intersection between two extensions of the reflecting surfaces of the reflecting members 103B and 103A adjacent to each other is a point of intersection 1001. Further, a straight line linking a point corresponding to a light source of the optical unit 102B as an optical unit provided at a distant side from the point of intersection 1001 with the point of intersection 1001 is a straight line 1002. It is also assumed that the angle which the straight line 1002 makes with the reflecting surface of the reflecting member 103A is θA, the angle which the straight line 1002 makes with the reflecting surface of the reflecting member 103B is θB, and that θA is larger than θB. The edge surface of the reflecting member 103B as the side where the angle formed with the surface and the straight line 1002 is smaller is provided at a some distance back from the point of intersection 1001, and the edge surface of the reflecting member 103A as the side where the angle formed with the surface and the straight line 1002 is larger is provided beyond the point of intersection 1001. With this feature, a space t3 is formed between the reflecting member 103A and reflecting member 103B.

Namely, the reflecting member 103B located in the position as the longitudinal side of the surface of the rectangular white board 101 is made shorter so as not to touch the other reflecting member, the reflecting member 103A located in the position as the lateral side thereof is extended beyond the corner section and a space t3 is formed at the corner section.

Operation of Embodiment 5 having the configuration as described above will be explained below. Assuming that a straight line linking an edge of the reflecting member 103B with a point corresponding to a light source of the optical unit 102B is a straight line 1003 on the coordinate plane, the light between the straight line 1002 and straight line 1003 is recursively reflected by the reflecting member 103A. If the reflecting member 103B was extended as far as the point of intersection 1001, the light between the straight line 1002 and straight line 1003 would be recursively reflected by the reflecting member 103B. In other words, the light directing around the section where two reflecting members are located adjacent to each other is reflected by one of the reflecting member for which the incident angle of the light is larger.

A reflecting member has a higher reflectivity when the incident angle of the light is larger. Namely, when the incident angle is closer to 90 degrees reflectivity is higher, and when the incident angle is away from 90 degrees reflectivity is less. The corner section where two reflecting members are provided adjacent to each other is a section where the incident angle of light from the optical unit is the smallest and recursive reflectivity is the lowest. The light irradiated from the optical unit and falling on this section is recursively reflected by a reflecting member into which the incident angle is larger. Namely, the light beam irradiated from the optical unit and falling on the corner section where the recursive reflectivity is low is reflected by a reflecting member having a higher reflectivity. It should be noted that the corner section formed with the reflecting members 103B and 103C has also the same configuration and operation as described above.

With Embodiment 5 as described above, a light beam irradiated from the optical unit and falling on the corner section where the recursive reflectivity is reflected by a reflecting member having a higher reflectivity, so that the reflectivity of the light beam at the corner section can be enhanced. In addition, the reflecting members are not joined to each other, so that degradation in reflectivity due to variations in joints therebetween will not occur.

Further, when reflecting members are joined to each other dirt can easily get accumulated and cleaning can not easily be carried out, however, since the spaces t3 are provided at the corner section formed with the reflecting members the dirt on the reflecting surface at the corner section can be reduced and the corner section can easily be cleaned.

Although it has been assumed that the angle θA is larger than the angle θB in Embodiment 5 the reverse is also allowable. In other words, when a portrait type of white board is used, the edge surface of the member 103A is provided at a some distance back from the point of intersection 1001 and the edge section of the member 103B is provided beyond the point of intersection 1001. When the angles θA and θB are equal to each other, in other words, when a square white board is used, the reflecting member 103B positioned in the lower side is made shorter. With this feature, a downward space is formed and the dirt can easily drop therein.

Figure 11:
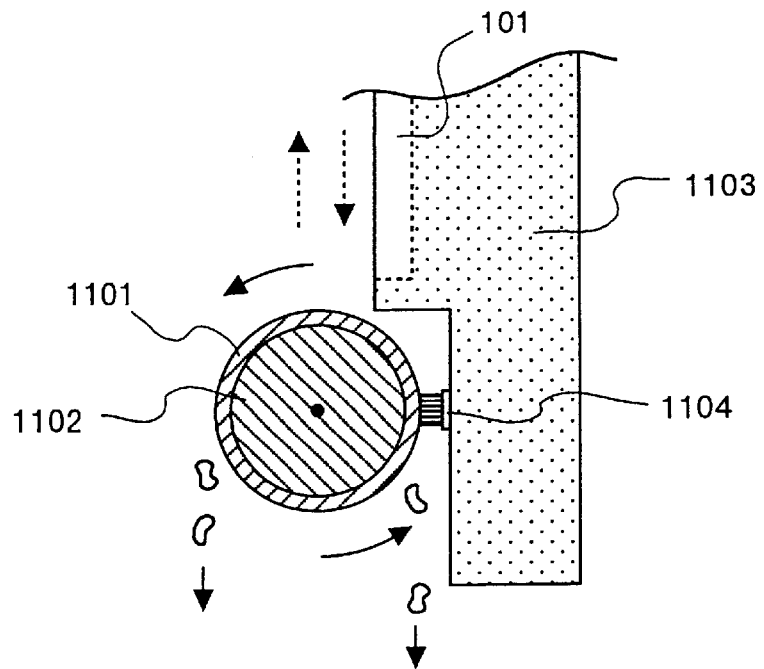
FIG. 11 is a cross-section explaining the configuration of a reflecting member according to Embodiment 6 of the present invention.

A coordinate-position detecting device according to Embodiment 6 has basically the same configuration as that in Embodiment 1, in addition, a cylindrical reflecting member is rotatably provided therein. As for the same sections as those in the coordinate-position detecting device in Embodiment 1, description thereof is omitted herein, and only the different sections will be explained. FIG. 11 is a cross-section explaining the configuration of a reflecting member according to Embodiment 6 of the present invention.

The reflecting member 1101 located at a position below the white board 101 in Embodiment 6 is adhered and fixed to the surface of a cylindrical supporting member 1102. The supporting member 1102 is rotatably held by a side plate not shown herein. A brush 1104 is provided between a base 1103 and the reflecting member 1101.

Operation of Embodiment 6 having the configuration as described above will be explained below. The reflecting member 1101 is rotated a half turn by a motor not shown herein or manually. With this, the surface from where recursive reflection was performed so far faces downward, and a new surface that was facing downward faces upward from where recursive reflection will be performed. Dirt deposited on the surface originally facing upward drops when the surface faces downward. Dirt adhered on the surface having faced downward due to static electricity is brushed off by the brush 1104.

With Embodiment 6 as described above, the reflecting member 1101 is rotated to make a half turn so that the dirt drops from the surface facing downward. Therefore, the dirt that may block the light falling on the reflecting member does not get deposited thereon, which allows frequency of occurrence of malfunction, interruption of works, and the load of cleaning onto a user to be reduced. Further, the dirt is brushed off by the brush 1104, so that the reflecting surface of a reflecting member can easily be cleaned.

Figure 12:
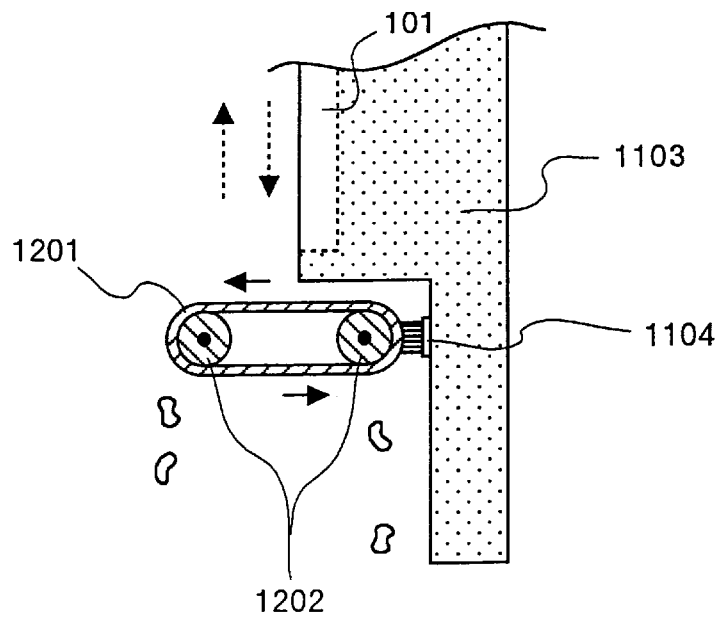
FIG. 12 is a cross-section explaining the configuration of a reflecting member according to Embodiment 7 of the present invention.

A coordinate-position detecting device according to Embodiment 7 has basically the same configuration as that in Embodiment 6, however, a reflecting member having a form of an endless belt which is rotated by rotating rollers is provided. As for the same sections as those in the coordinate-position detecting device in Embodiment 6, description thereof is omitted herein, and only the different sections will be explained. FIG. 12 is a cross-section explaining the configuration of a reflecting member according to Embodiment 7 of the present invention.

A reflecting member 1201 located at a position below the white board 101 in Embodiment 7 is made with an endless belt and is rotatably held by rollers 1202. The rollers 1202 are rotatably held by a side plate not shown herein. A brush 1104 is provided between the base 1103 and the reflecting member 1201.

Operation of Embodiment 7 having the configuration as described above will be explained below. The reflecting member 1201 is rotated by a motor not shown herein or manually, so that the surface on which recursive reflection is performed so far faces downward, and a hidden surface appears, through which recursive reflection is performed. Dirt adhered on the surface having faced upward drops when the surface faces downward. Dirt adhered on the surface having faced downward due to static electricity is brushed off by the brush 1104.

With Embodiment 7 as described above, the reflecting member 1201 made with the endless belt is rotated, the dirt deposited on the surface drops from the surface when it faces downward. Hence, the dirt that may block the light falling on the reflecting member will be difficult to get deposited thereon, which allows frequency of occurrence of malfunction, interruption of works, and the load of cleaning onto a user to be reduced. Further, the dirt is brushed off by the brush 1104, so that the reflecting surface of a reflecting member can easily be cleaned.

Figure 13:
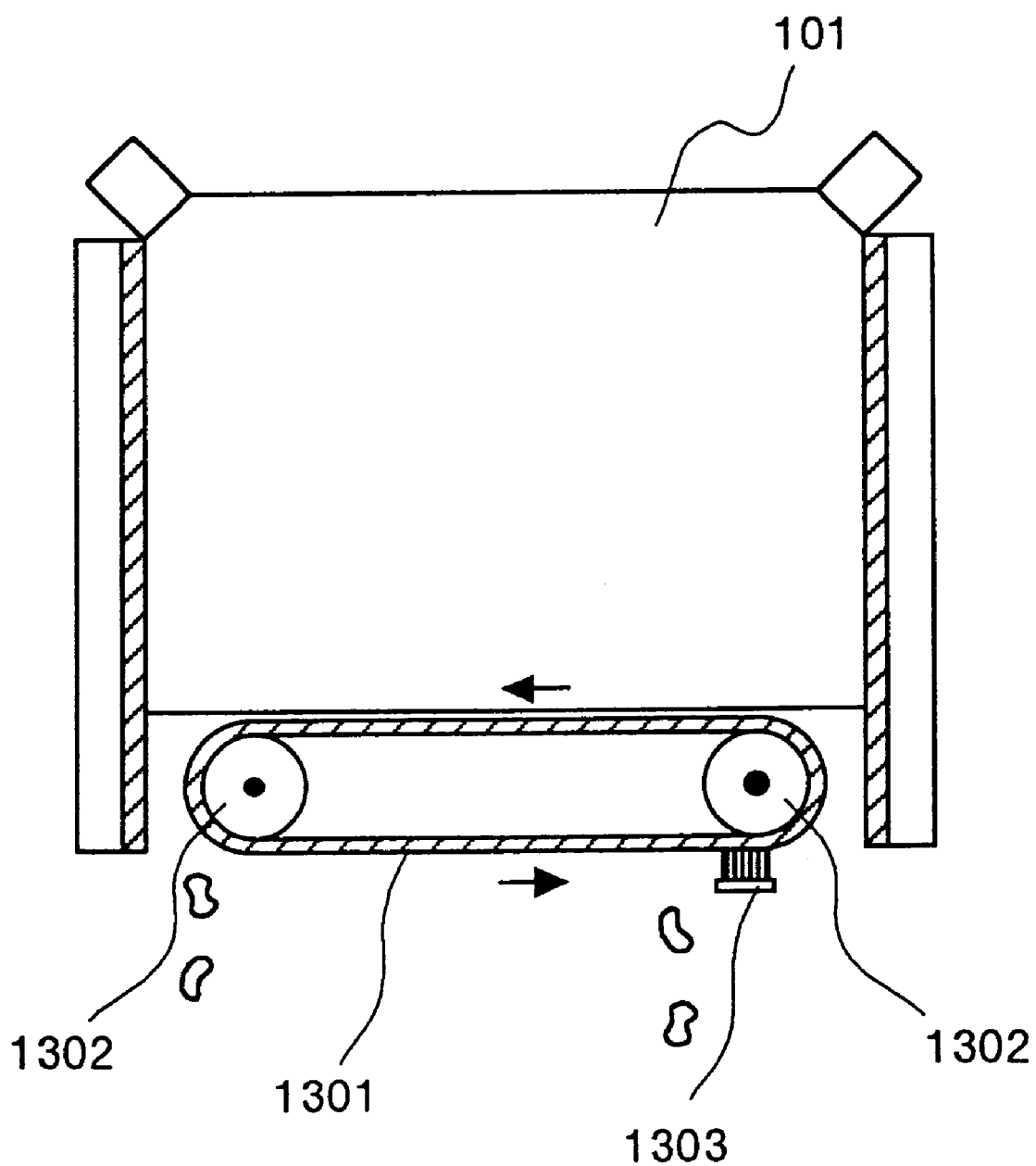
FIG. 13 is a front view of a coordinate-position detecting device according to Embodiment 8 of the present invention.

A coordinate-position detecting device according to Embodiment 8 has basically the same configuration as that in Embodiment 7, however, the direction in which a reflecting member rotates is different. As for the same sections as those in the coordinate-position detecting device in Embodiment 7, description thereof is omitted herein, and only the different sections will be explained. FIG. 13 shows a front view of a coordinate-position detecting device according to Embodiment 8 of the present invention.

A reflecting member 1301 located at a position below the white board 101 in Embodiment 8 has a belt shape with the ends joined and is rotatably held in the horizontal direction with respect to the surface of the white board 101 by rollers 1302 each having an axis perpendicular to the white board 101. The rollers 1302 are rotatably held by a base not shown herein. A brush 1303 is mounted on the base not shown herein so as to contact the reflecting member 1301.

Operation of Embodiment 8 having the configuration as described above will be explained below. The reflecting member 1301 is rotated a half turn by a motor not shown herein or manually, so that the surface on which recursive reflection is performed so far faces downward, and the surface having faced downward faces upward, through which recursive reflection is performed. Dirt adhered on the surface having faced upward drops when the surface faces downward. Dirt adhered on the surface having faced downward due to static electricity is brushed off by the brush 1303.

With Embodiment 8 as described above, the reflecting member 1301 is rotated a half turn so that the dirt drops from the surface facing downward. Therefore, the dirt that may block the light falling on the reflecting member is difficult to get deposited thereon, which allows frequency of occurrence of malfunction, interruption of works, and the load of cleaning onto a user to be reduced. Further, the dirt is brushed off by the brush 1303, so that the reflecting surface of a reflecting member can easily be cleaned.

Figure 14A:
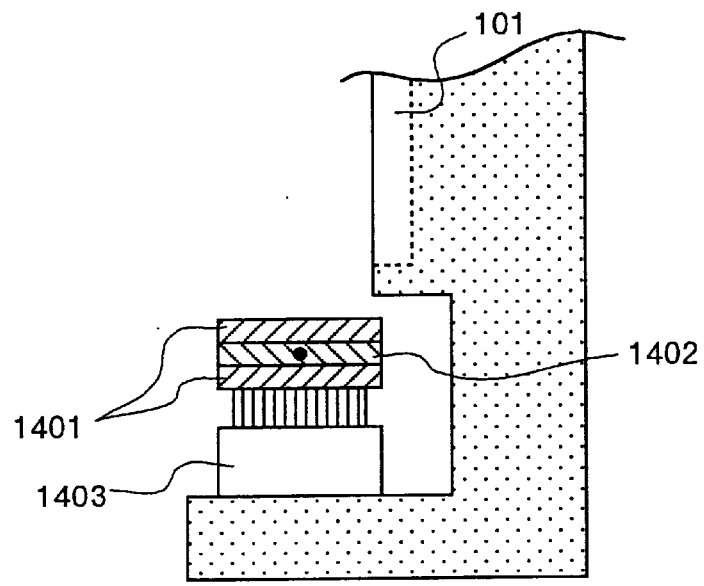
FIG. 14A is a cross-section explaining the configuration of a reflecting member and FIG. 14B is a general front view of a coordinate-position detecting device according to Embodiment 9 of the present invention.
Figure 14B:
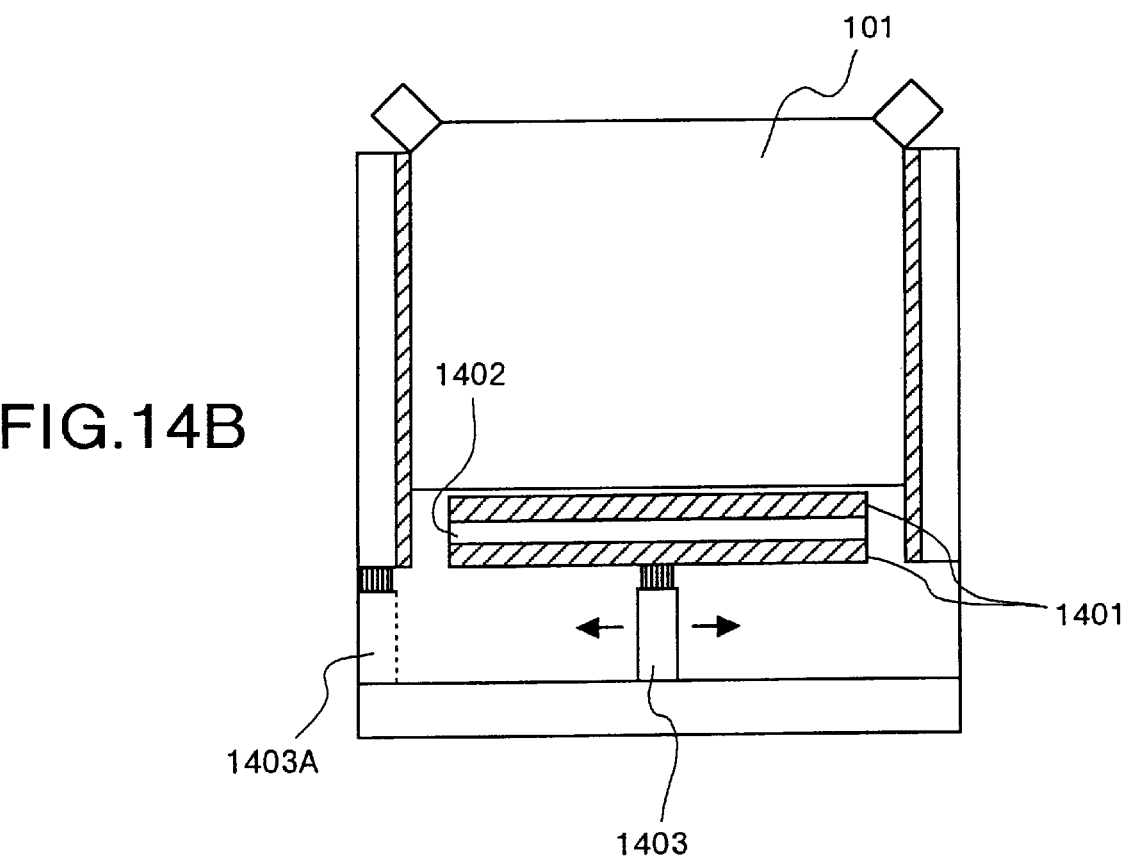

A coordinate-position detecting device according to Embodiment 9 has basically the same configuration as that in Embodiment 6, however, a plate reflecting member is rotatably provided therein. As for the same sections as those in the coordinate-position detecting device in Embodiment 6, description thereof is omitted herein, and only the different sections will be explained. FIG. 14A is a cross-section explaining the configuration of a reflecting member and FIG. 14B is a front view of a coordinate-position detecting device according to Embodiment 9 of the present invention.

The reflecting member 1401 located at a position below the white board 101 in Embodiment 9 is adhered and fixed to both faces of a plate supporting member 1402, and the supporting member 1402 is mounted on a side plate not shown herein so as to be rotatable in the vertical direction with respect to the surface of the white board 101. A brush 1403 is provided under the reflecting member 1401 so as to be movable in the horizontal direction to the panel.

Operation of Embodiment 9 having the configuration as described above will be explained below. The reflecting member 1401 is rotated a half turn by a motor not shown herein or manually, so that the surface on which recursive reflection is performed so far faces downward, and the surface having faced downward faces upward, through which recursive reflection is performed. Dirt adhered on the surface having faced upward drops when the surface faces downward. The dirt adhered on the surface having faced downward due to static electricity is brushed off by the brush 1403. When the reflecting member 1401 is rotated, the brush 1403 is stored in a home position 1403A as a position not to interrupt its rotation.

A gear mechanism (an angle adjusting unit) with which the supporting member 1402 and reflecting member 1401 can be fixed at an arbitrary angle may be provided therein. In this case, by fixing the reflecting surface of the reflecting member 1401 at an angle other than the normal with respect to the direction of gravity, in other words, at an angle with an inclination to the ground, the dirt on the reflecting surface of the reflecting member 1401 slips down along the reflecting surface.

With Embodiment 9 as described above, the reflecting member 1301 is rotated a half turn so that the dirt drops from the surface facing downward. Hence, the dirt that may block the light falling on the reflecting member is difficult to get deposited thereon, which allows frequency of occurrence of malfunction, interruption of works, and the load of cleaning onto a user to be reduced. Further, dirt is brushed off by the brush 1403, so that the reflecting surface of a reflecting member can easily be cleaned.

When the gear mechanism (angle adjusting unit) with which the supporting member 1402 and reflecting member 1401 can be fixed at an arbitrary angle is provided therein, by fixing the reflecting surface of the reflecting member 1401 at an angle other than the normal with respect to the direction of gravity, in other words, at an angle with an inclination to the ground, dirt on the reflecting surface of the reflecting member 1401 slips down along the reflecting surface. Hence, the dirt that may block the light falling on the reflecting member will not get deposited thereon, which allows frequency of occurrence of malfunction, interruption of works, and the load of cleaning onto a user to be reduced.

Figure 15:
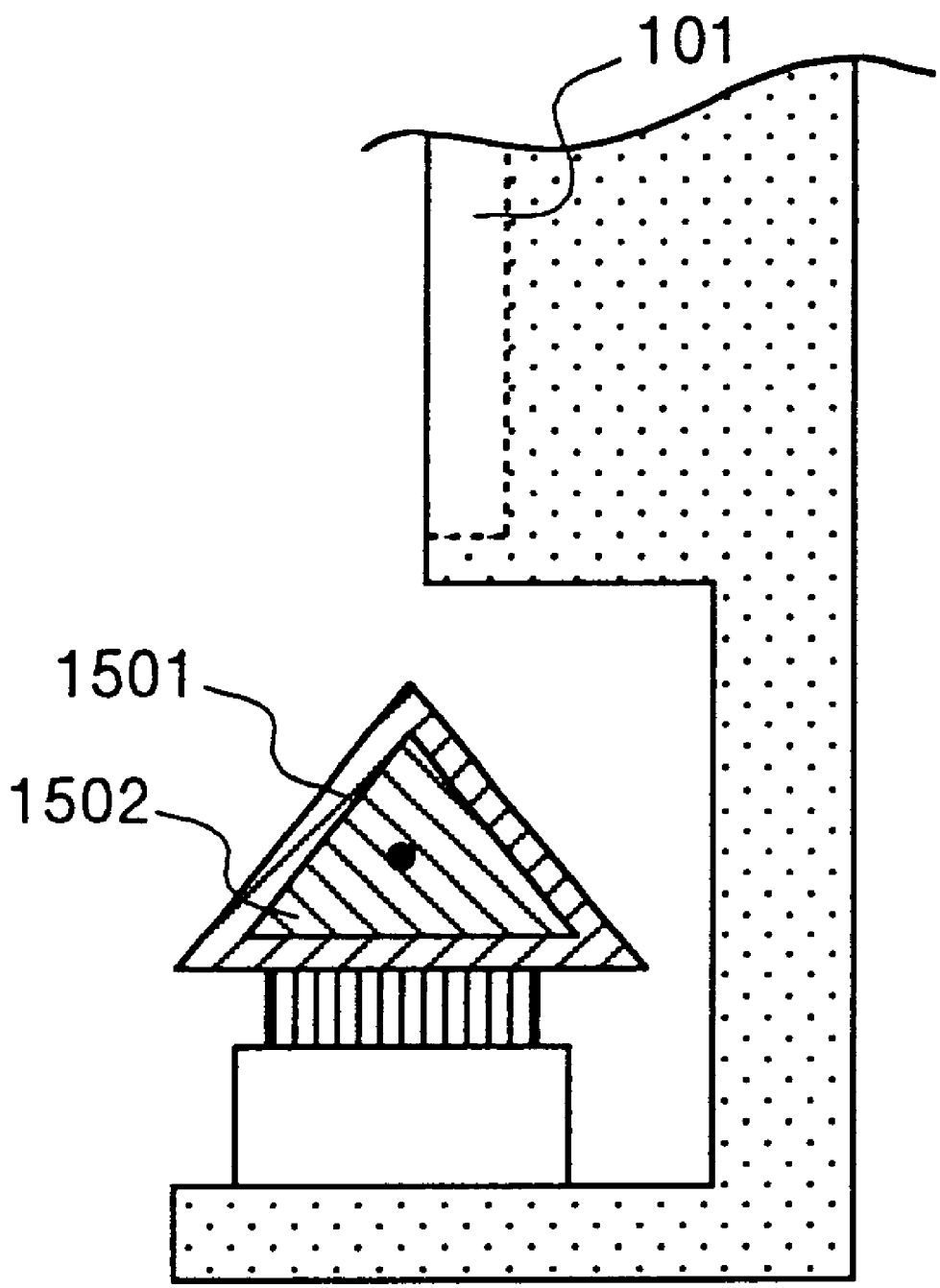
FIG. 15 is a cross-section explaining the another configuration of the reflecting member according to Embodiment 9.
Figure 16:
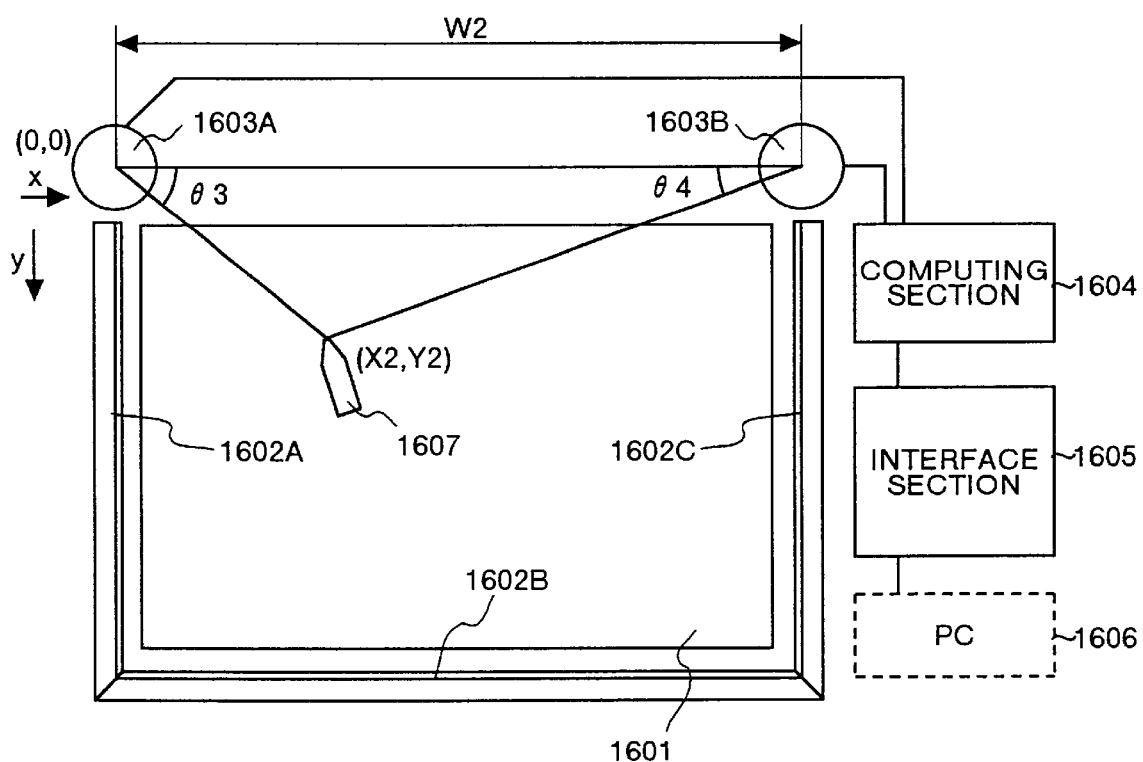
FIG. 16 shows a coordinate-position detecting device based on the conventional technology.

It should be noted that the same effect can also be obtained by using a triangle pole-shaped supporting member 1502 as shown in FIG. 15 in place of the plate supporting member 1402 and adhering and fixing a reflecting member 1501 to the surface thereof.

As described above, in the present invention, angle of the reflecting surface of a recursively reflecting unit is adjusted by an angle adjusting unit. Thus, the angle between the surface of a white board or the display unit and the reflecting surface of the recursively reflecting unit can be adjusted to such an angle that the dirt does not get deposited on the reflecting surface. Hence, it is difficult for the dirt to get deposited on the reflecting surface of a reflecting member, which allows frequency of occurrence of malfunction, interruption of works, and the load of cleaning onto a user to be reduced.

Further, angle of the reflecting surface of a recursively reflecting unit is adjusted by an angle adjusting unit. Thus, the angle between the surface of a white board or the display unit and the reflecting surface of the recursively reflecting unit can be adjusted to such an angle that the dirt deposited on the reflecting surface can easily be cleaned. Hence, cleaning of the reflecting surface can easily be carried out.

In the present invention, angle between the reflecting surface of a reflecting member provided in the bottom side forming a rectangle and the surface of the white board or the display unit is an obtuse angle. Further, of angles obtained by dividing the angle which the reflecting surface of the bottom-side reflecting member forms with the surface of the white board or the display unit by a horizontal surface, the angle which the reflecting surface forms with the horizontal surface is an acute angle. Therefore, dirt drops on the reflecting surface of the bottom-side reflecting member and then slips down along the reflecting surface thereof. Hence, it is difficult for the dirt on the reflecting surface of a reflecting member to remain there, which allows frequency of occurrence of malfunction, interruption of works, and the load of cleaning onto a user to be reduced.

In the present invention, the angle between the reflecting surface of a reflecting member provided in the bottom side forming a rectangle and the surface of the white board or the display unit is an acute angle. Further, a space is provided between the reflecting surface of the bottom-side reflecting member and the surface of the white board or the display unit. Therefore, when the dirt drops on the reflecting surface of the bottom-side reflecting member it slips down along the reflecting surface thereof into the space. Hence, it is difficult for the dirt on the reflecting surface of a reflecting member to remain there, which allows frequency of occurrence of malfunction, interruption of works, and the load of cleaning onto a user to be reduced.

In the present invention, angle between the surface of the white board or the display unit and the reflecting surface of the reflecting member is adjusted by an angle adjusting unit. Thus, angle between the surface of the white board or the display unit and the reflecting surface of the recursively reflecting unit can be adjusted to such an angle at which the dirt can not get deposited on the reflecting surface. Hence, it is difficult for the dirt to get deposited on the reflecting surface of a reflecting member, which allows frequency of occurrence of malfunction, interruption of works, and the load of cleaning onto a user to be reduced and the reflecting surface of a reflecting member to easily be cleaned.

In the present invention, a reflecting member is detachably provide d therein, so that the reflecting member can be detached from the coordinate-position detecting device to be cleaned and attached thereto again after cleaning, which allows the reflecting surface of a reflecting member to easily be cleaned.

In the present invention, spaces are provided at the corner sections where cleaning is difficult and dirt is easily accumulated. Therefore, dirt does not get accumulated at the corner s and cleaning thereof can easily be carried out.

In the present invention, at the corners of the reflecting members in two sides where incident angle of light from the light source is the smallest and reflectivity is the lowest, the light is reflected by the reflecting surface of a reflecting member with a larger incident angle of the light. In other words, the light falling on th e corners is reflected by a reflecting member having higher reflectivity, which allows reflectivity of a light beam at the corners of the reflecting members in two sides to be enhanced.

In the present invention, a cylindrical reflecting member rotates around the center of the circle as a central axis so that dirt deposited on the reflecting surface thereof drops when the reflecting surface is facing toward the direction of gravity, in other words directed downward. Hence, it is difficult for the dirt on the reflecting surface of a reflecting member to remain their, which allows frequency of occurrence of malfunction, interruption of works, and the load of cleaning onto a user to be reduced.

In the present invention, the reflecting member is formed in an endless belt and is rotated by a rotating roller. Thus, dirt deposited on the reflecting surface thereof drops when the reflecting surface faces toward the direction of gravity, in other words faces downward. Hence, it is difficult for the dirt on the reflecting surface of a reflecting member to remain there, which allows frequency of occurrence of malfunction, interruption of works, and the load of cleaning onto a user to be reduced.

In the present invention, a cleaning unit cleans the surface of a reflecting member when the reflecting member is rotated, so that cleaning of a reflecting member can easily be carried out.

In the present invention, a plate shaped reflecting member is turned upside down. Thus, dirt deposited on the reflecting surface thereof drops when the reflecting surface is faces toward the direction of gravity, in other words faces downward. Hence, it is difficult for the dirt on the reflecting surface of a reflecting member to remain there, which allows frequency of occurrence of malfunction, interruption of works, and the load of cleaning onto a user to be reduced.

In the present invention, a polygonal reflecting member rotates with respect to its central axis. Thus, dirt deposited on the reflecting surface thereof drops when the reflecting surface faces toward the direction of gravity, in other words faces downward. Hence, it is difficult for the dirt on the reflecting surface of a reflecting member to remain there, which allows frequency of occurrence of malfunction, interruption of works, and the load of cleaning onto a user to be reduced.

In the present invention, a cleaning unit moves along the reflecting surface of a reflecting member in the side where the light irradiated from a light source does not reach and cleans the reflecting surface, so that cleaning of a reflecting member can easily be carried out.

In the present invention, transparent hard coating provided on the surface of a reflecting member protects the reflecting surface of the reflecting member, so that the reflecting surface of a reflecting member does not require any particular care in cleaning thereof, so that cleaning of a reflecting member can easily be carried out.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:
   a light source means for irradiating light which is substantially parallel to said write-in surface or said display surface;
   a recursively reflecting means having a reflecting surface for recursively reflecting the light irradiated from said light source means;
   a light receiving means for receiving the light reflected by said recursively reflecting means; and
   an angle adjusting means for adjusting an angle between said write-in surface or said display surface and said reflecting surface of said recursively reflecting means to an arbitrary angle.

2. A coordinate-position detecting device according to claim 1; wherein said recursively reflecting means has transparent hard coating provided on the surface thereof.

3. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:
   at least two light source means for irradiating light which is substantially parallel to said write-in surface or said display surface;
   a recursively reflecting means having reflecting members for recursively reflecting the light irradiated from said light sources means provided in an inner side from at least three frame edges of four edges of a frame having a rectangular shape; and at least two light receiving means each for receiving the light reflected by said recursively reflecting means; wherein of the reflecting members of said recursively reflecting means, the angle between the reflecting surface of the reflecting member provided in the bottom side of the rectangle shape and the write-in surface or the display surface is an obtuse angle, and of angles obtained by dividing the angle which the reflecting surface of the reflecting member in the bottom side of the rectangle shape makes with the write-in surface or the display surface by a horizontal surface, the angle between the reflecting surface and the horizontal surface is an acute angle.

4. A coordinate-position detecting device according to claim 3 further comprising an angle adjusting means for adjusting an angle between the write-in surface or the display surface and the reflecting surface of the reflecting member.

5. A coordinate-position detecting device according to claim 3; wherein the reflecting members are detachably provided therein.

6. A coordinate-position detecting device according to claim 3; wherein said recursively reflecting means has spaces at corner sections of four edges of the frame forming the rectangle by shorting one frame edge of the two frame edges adjacent to each other so that the frame edge does not reach the other frame edge and extending the other frame edge beyond the corner section.

7. A coordinate-position detecting device according to claim 6; wherein a longer edge of the four edges of the frame forming the rectangle is one frame edge of said two frame edges and a shorter edge of the frame is the other frame edge thereof.

8. A coordinate-position detecting device according to claim 3; wherein said reflecting members have a transparent hard coating provided on the surface thereof.

9. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:

at least two light source means for irradiating light which is substantially parallel to said write-in surface or said display surface;

a recursively reflecting means having reflecting members for recursively reflecting the light irradiated from said light source means provided in an inner side from at least three frame edges of four edges of a frame having a rectangular shape; and at least two light receiving means each for receiving the light reflected by said recursively reflecting means; wherein of the reflecting members of said recursively reflecting means, the angle between the reflecting surface of the reflecting member provided in the bottom side of the rectangular shape and the write-in surface or the display surface is an acute angle, and a space is provided between the reflecting surface of the bottom-side reflecting member and the write-in surface or the display surface.

10. A coordinate-position detecting device according to claim 9 further comprising an angle adjusting means for adjusting an angle between the write-in surface or the display surface and the reflecting surface of the reflecting members.

11. A coordinate-position detecting device according to claim 9; wherein the reflecting members are detachably provided therein.

12. A coordinate-position detecting device according to claim 9; wherein said recursively reflecting means has spaces at corner sections of four edges of the frame forming the rectangle by shorting one frame edge of the two frame edges adjacent to each other so that the frame edge does not reach the other frame edge and extending the other frame edge beyond the corner section.

13. A coordinate-position detecting device according to claim 12; wherein a longer edge of the four edges of the frame forming the rectangle is one frame edge of said two frame edges and a shorter edge of the frame is the other frame edge thereof.

14. A coordinate-position detecting device according to claim 9; wherein said reflecting members have a transparent hard coating provided on the surface thereof.

15. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:

a light source means for irradiating light which is substantially parallel to said write-in surface or said display surface;

a recursively reflecting means having reflecting members for recursively reflecting the light irradiated from said light source means; and a light receiving means for receiving the light reflected by said recursively reflecting means; wherein the reflecting member of said recursively reflecting means provided on the bottom side has a cylindrical shape and is so fixed that it can be rotated around the central axis.

16. A coordinate-position detecting device according to claim 15 further comprising a cleaning means for cleaning the surface of said reflecting member provided on the bottom side when the reflecting member is rotated.

17. A coordinate-position detecting device according to claim 15; wherein said reflecting member provided on the bottom side has a transparent hard coating provided on the surface thereof.

18. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:

a light source means for irradiating light which is substantially parallel to said write-in surface or said display surface;

a recursively reflecting means having reflecting members for recursively reflecting the light irradiated from said light source means; and a light receiving means for receiving the light reflected by said recursively reflecting means; wherein the reflecting member of the recursively reflecting means provided on the bottom side has a form of an endless belt and is rotatably supported by a rotating roller.

19. A coordinate-position detecting device according to claim 18 further comprising a cleaning means for cleaning the surface of said reflecting member provided on the bottom side when the reflecting member is rotated.

20. A coordinate-position detecting device according to claim 18; wherein said reflecting member provided on the bottom side has a transparent hard coating provided on the surface thereof.

21. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:

a light source means f or irradiating light which is substantially parallel to said write-in surface or said display surface;

a recursively reflecting means having reflecting members for recursively reflecting the light irradiated from said light source means; and a light receiving means for receiving the light reflected by said recursively reflecting unit; wherein the reflecting member of the recursively reflecting means provided on the bottom side is plate shaped and reflecting surfaces are provided on both sides thereof, and is so fixed that it can be turned upside down.

22. A coordinate-position detecting device according to claim 21 further comprising a cleaning means moving along the reflecting surface of said reflecting member provided on the bottom side in the side where the light irradiated from the light source does not reach for cleaning the reflecting surface.

23. A coordinate-position detecting device according to claim 21; wherein said reflecting member provided on the bottom side has a transparent hard coating provided on the surface thereof.

24. A coordinate-position detecting device that forms a touch-panel surface by irradiating light which is substantially parallel to a write-in surface of a white board or a display surface of a display means and detects a position where the light in the touch-panel surface is blocked, said coordinate-position detecting device comprising:

a light source means f or irradiating light which is substantially parallel to said write-in surface or said display surface;

a recursively reflecting means having reflecting members for recursively reflecting the light irradiated from said light source means; and a light receiving means for receiving the light reflected by said recursively reflecting means; wherein said reflecting member of the recursively reflecting means provided on the bottom side is a polygonal cylinder and is so fixed that it can be rotated around its central axis.

25. A coordinate-position detecting device according to claim 24 further comprising a cleaning means moving along the reflecting surface of said reflecting member provided on the bottom side in the side where the light irradiated from the light source does not reach for cleaning the reflecting surface.

26. A coordinate-position detecting device according to claim 24; wherein said reflecting member provided on the bottom side has a transparent hard coating provided on the surface thereof.

27. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

a light source for irradiating light which is substantially parallel to said write-in surface or said display surface;

a recursively reflecting unit having a reflecting surface for recursively reflecting the light irradiated from said light source;

a light receiving unit for receiving the light reflected by said recursively reflecting unit; and an angle adjusting unit for adjusting an angle between said write-in surface or said display surface and said reflecting surface of said recursively reflecting unit to an arbitrary angle.

28. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

at least two light source for irradiating light which is substantially parallel to said write-in surface or said display surface;

a recursively reflecting unit having reflecting members for recursively reflecting the light irradiated from said light sources provided in an inner side from at least three frame edges of four edges of a frame having a rectangular shape; and at least two light receiving unit each f or receiving the light reflected by said recursively reflecting unit; wherein of the reflecting members of said recursively reflecting unit, the angle between the reflecting surface of the reflecting member provided in the bottom side of the rectangle shape and the write-in surface or the display surface is an obtuse angle, and of angles obtained by dividing the angle which the reflecting surface of the reflecting member in the bottom side of the rectangle shape makes with the write-in surface or the display surface by a horizontal surface, the angle between the reflecting surface and the horizontal surface is an acute angle.

29. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

at least two light source for irradiating light which is substantially parallel to said write-in surface or said display surface;

a recursively reflecting unit having reflecting members for recursively reflecting the light irradiated from said light sources provided in an inner side from at least three frame edges of four edges of a frame having a rectangular shape; and at least two light receiving unit each for receiving the light reflected by said recursively reflecting unit; wherein of the reflecting members of said recursively reflecting unit, the angle between the reflecting surface of the reflecting member provided in the bottom side of the rectangular shape and the write-in surface or the display surface is an acute angle, and a space is provided between the reflecting surface of the bottom-side reflecting member and the write-in surface or the display surface.

30. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

a light source for irradiating light which is substantially parallel to said write-in surface or said display surface;

a recursively reflecting unit having reflecting members for recursively reflecting the light irradiated from said light source; and a light receiving unit for receiving the light reflected by said recursively reflecting unit; wherein the reflecting member of said recursively reflecting unit provided on the bottom side has a cylindrical shape and is so fixed that it can be rotated around a central axis.

31. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

a light source for irradiating light which is substantially parallel to said write-in surface or said display surface;

a recursively reflecting unit having reflecting members for recursively reflecting the light irradiated from said light source; and a light receiving unit for receiving the light reflected by said recursively reflecting unit; wherein the reflecting member of said recursively reflecting unit provided on the bottom side has a form of an endless belt and is rotatably supported by a rotating roller.

32. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

a light source for irradiating light which is substantially parallel to said write-in surface or said display surface;

a recursively reflecting unit having reflecting members for recursively reflecting the light irradiated from said light source; and a light receiving unit for receiving the light reflected by said recursively reflecting unit; wherein the reflecting member of said recursively reflecting unit provided on the bottom side is plate shaped and reflecting surfaces are provided on both sides thereof, and is so fixed that it can be turned upside down.

33. A coordinate-position detecting device that forms a touch-panel surface by irradiating light which is substantially parallel to a write-in surface of a white board or a display surface of a display unit and detects a position where the light in the touch-panel surface is blocked, said coordinate-position detecting device comprising:

a light source for irradiating light which is substantially parallel to said write-in surface or said display surface;

a recursively reflecting unit having reflecting members for recursively reflecting the light irradiated from said light source; and a light receiving unit for receiving the light reflected by said recursively reflecting unit; wherein said reflecting member of said recursively reflecting unit provided on the bottom side is a polygonal cylinder and is so fixed that it can be rotated around its central axis.

34. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light with a light source, which light is substantially parallel to said write-in surface or said display surface;

recursively reflecting the light irradiated from said light source with a recursively reflecting unit having a reflecting surface;

receiving the light reflected in said recursively reflecting step; and adjusting an angle between said write-in surface or said display surface and said reflecting surface of said recursively reflecting unit to an arbitrary angle.

35. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light from at least two light sources which light is substantially parallel to said write-in surface or said display surface;

recursively reflecting the light irradiated from said light source with a recursively reflecting unit having reflecting members, said recursively reflecting unit provided in an inner side from at least three frame edges of four edges of a frame having a rectangular shape; and receiving the light reflected by said recursively reflecting unit with at least two light receiving units; wherein of the reflecting members of said recursively reflecting unit, the angle between the reflecting surface of the reflecting member provided in the bottom side of the rectangle shape and the write-in surface or the display surface is an obtuse angle, and of angles obtained by dividing the angle which the reflecting surface of the reflecting member in the bottom side of the rectangle shape makes with the write-in surface or the display surface by a horizontal surface, the angle between the reflecting surface and the horizontal surface is an acute angle.

36. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light from at least two light sources which light is substantially parallel to said write-in surface or said display surface;

recursively reflecting the light irradiated from said light source with a recursively reflecting unit having reflecting members, said recursively reflecting unit provided in an inner side from at least three frame edges of four edges of a frame having a rectangular shape; and receiving the light reflected by said recursively reflecting unit with at least two light receiving units; wherein of the reflecting members of said recursively reflecting unit, the angle between the reflecting surface of the reflecting member provided in the bottom side of the rectangular shape and the write-in surface or the display surface is an acute angle, and a space is provided between the reflecting surface of the bottom-side reflecting member and the write-in surface or the display surface.

37. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light with a light source, which light is substantially parallel to said write-in surface or said display surface;

recursively reflecting the light irradiated from said light source with a recursively reflecting unit having reflecting members; and receiving the light reflected in said recursively reflecting step; wherein the reflecting member of said recursively reflecting unit provided on the bottom side has a cylindrical shape and is so fixed that it can be rotated around a central axis.

38. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light with a light source, which light is substantially parallel to said write-in surface or said display surface;

recursively reflecting the light irradiated from said light source with a recursively reflecting unit having reflecting members; and receiving the light reflected in said recursively reflecting step; wherein the reflecting member of said recursively reflecting unit provided on the bottom side has a form of an endless belt and is rotatably supported by a rotating roller.

39. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light with a light source, which light is substantially parallel to said write-in surface or said display surface;

recursively reflecting the light irradiated from said light source with a recursively reflecting unit having reflecting members; and receiving the light reflected in said recursively reflecting step; wherein the reflecting member of said recursively reflecting unit provided on the bottom side is plate shaped and reflecting surfaces are provided on both sides thereof, and is so fixed that it can be turned upside down.

40. A coordinate-position detecting method for forming a touch-panel surface by irradiating light which is substantially parallel to a write-in surface of a white board or a display surface of a display unit and for detecting a position where the light in the touch-panel surface is blocked, said coordinate-position detecting method comprising steps of:

irradiating light with a light source, which light is substantially parallel to said write-in surface or said display surface;

recursively reflecting the light irradiated from said light source with a recursively reflecting unit having reflecting members; and receiving the light reflected in said recursively reflecting step; wherein said reflecting member of said recursively reflecting unit provided on the bottom side is a polygonal cylinder and is so fixed that it can be rotated around its central axis.

* * * * *